US012586075B2

(12) United States Patent
M et al.

(10) Patent No.: US 12,586,075 B2
(45) Date of Patent: Mar. 24, 2026

(54) GENERATION OF INTEGRATION CONTENT FOR TRANSACTION NETWORKS

(71) Applicant: SAP SE, Walldorf (DE)

(72) Inventors: Bipin M, Bangalore (IN); Priyanka Khaitan, Cupertino (IN); Santosh Kumar Maddula, Walldorf (DE); Abhay Joshi, Walldorf (DE); Ankit Kumar, Walldorf (DE); Ramya Ramesh, Walldorf (DE)

(73) Assignee: SAP SE, Walldorf (DE)

( * ) Notice: Subject to any disclaimer, the term of this patent is extended or adjusted under 35 U.S.C. 154(b) by 105 days.

(21) Appl. No.: 18/144,496

(22) Filed: May 8, 2023

(65) Prior Publication Data

US 2024/0378618 A1      Nov. 14, 2024

(51) Int. Cl.
G06Q 20/40 (2012.01)
(52) U.S. Cl.
CPC ................................. G06Q 20/405 (2013.01)
(58) Field of Classification Search
CPC .................................................... G06Q 20/405
USPC .......................................................... 705/44
See application file for complete search history.

(56) References Cited

U.S. PATENT DOCUMENTS 11,074,270 B2      7/2021 Deshnukh et al.
11,461,357 B2 * 10/2022 Bagg ..................... G06F 40/151

2002/0099735 A1 *  7/2002 Schroeder ............. G06F 40/154
                                                               715/239
2010/0332479 A1 * 12/2010 Prahlad ............... G06F 16/1748
                                                               707/661
2013/0018904 A1 *  1/2013 Mankala .................. G06F 16/93
                                                               707/756
2014/0222599 A1 *  8/2014 Wang .................... H04L 51/222
                                                               705/39
2017/0134323 A1 *  5/2017 Alexander ............. H04L 51/216
2022/0027382 A1 *  1/2022 Bagg ..................... G06F 16/258

* cited by examiner

*Primary Examiner* — Hai Tran

(74) *Attorney, Agent, or Firm* — Buckley, Maschoff & Talwalkar LLC

(57)      ABSTRACT

Briefly, embodiments of a system, method, and article for receiving a request, via a user interface, from a first backend system on a central exchange. The request may be for a determination of a schema for documentation produced by a second backend system on the central exchange. The second backend system may engage in one or more transactions with the first backend system. The first backend system may be integrated with the central exchange. The schema for the documentation generated by the second backend system over the central exchange may be automatically determined. Rules for transactions with the second backend system may be automatically determined. The schema and rules for the second backend system may be automatically combined. The integration package may be automatically generated and deployed within a conversion layer of the first backend system.

20 Claims, 23 Drawing Sheets

400A

Home　Search　Enablement　Opportunities　Workbench　Orders　Fulfillment ∨　Quality　Invoices　Reports　More　　　▤ ⑦ ⓞⓟ
　Create ∨

Current Customers　　　　　　　　　　　　　　　　　　　　　　　　　　　　　Close

Filter
Customers
Enter customer name or Network ID　　＋
Apply　Reset

| Customer | Network ID | Relationship Type | Approved Date | Integration Status | Routing Type | Actions |
|---|---|---|---|---|---|---|
| Company A | AN02000025603 | Trading | 28 Sep 2020 | ○ Package created | Default | Actions ▽ |
| Company B | AN02000058390 | Trading | 12 Feb 2021 | ● Active | Default | Actions ▽ |
| Company C | AN05600088369 | Trading | 23 Mar 2021 | ○ Package created | Default | Actions ▽ |
| Company D | AN89200088923 | Trading | 10 May 2021 | ○ Package created | Default | Actions ▽ |
| Company E | AN02023058339 | Trading | 18 Aug 2022 | ○ Package created | Default | Actions ▽ |
| Company F | AN02500025901 | Trading | 03 Oct 2022 | ✕ Inactive | Default | Actions ▽ |

Reject

Figure 5A:
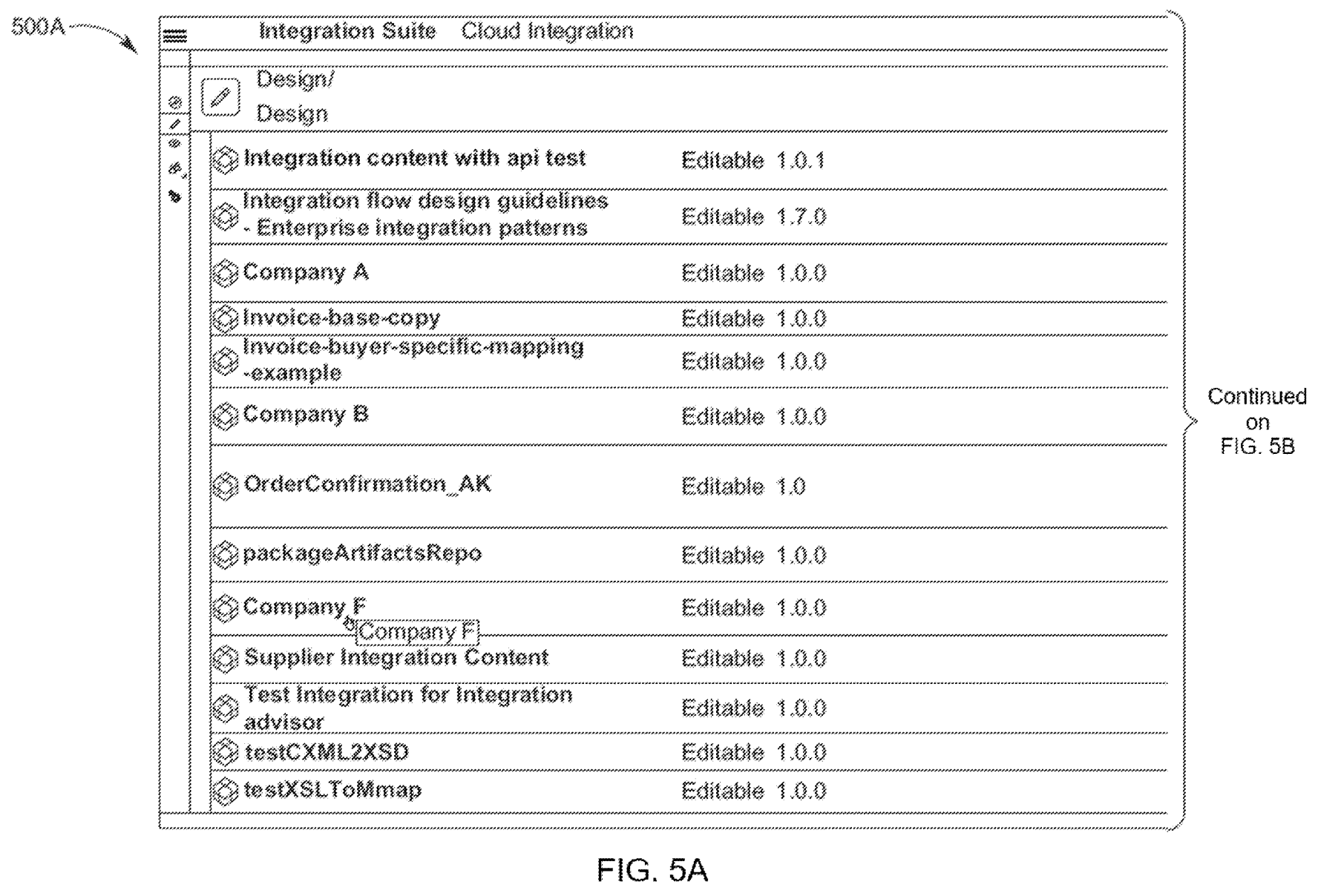

Integration Suite  Cloud Integration

Design/
Design

| | | |
|---|---|---|
| Integration content with api test | Editable | 1.0.1 |
| Integration flow design guidelines - Enterprise integration patterns | Editable | 1.7.0 |
| Company A | Editable | 1.0.0 |
| Invoice-base-copy | Editable | 1.0.0 |
| Invoice-buyer-specific-mapping -example | Editable | 1.0.0 |
| Company B | Editable | 1.0.0 |
| OrderConfirmation_AK | Editable | 1.0 |
| packageArtifactsRepo | Editable | 1.0.0 |
| Company F | Editable | 1.0.0 |
| Supplier Integration Content | Editable | 1.0.0 |
| Test Integration for Integration advisor | Editable | 1.0.0 |
| testCXML2XSD | Editable | 1.0.0 |
| testXSLToMmap | Editable | 1.0.0 |

500A

| | | Create | Import |
|---|---|:---:|:---:|
| Thu, 18 Aug 2022 15:11:20 GMT | Flows & message mapping for Company B | 🗑 | ⌄ |
| Wed, 15 Feb 2023 02:09:08 GMT | This integration package contains integration flows to illustrate the design of the most common enterprise integration patterns | 🗑 | ⌄ |
| Wed, 15 Feb 2023 16:11:38 GMT | Buyer Company A specific package | 🗑 | ⌄ |
| Mon, 05 Sep 2022 10:12:10 GMT | Invoice base copy | 🗑 | ⌄ |
| Tue, 13 Sep 2022 11:46:31 GMT | Example of mappings and flow for buyer specific xsd with extrinsic fields as mandatory and other rules. | 🗑 | ⌄ |
| Mon, 30 Jan 2023 10:49:58 GMT | Buyer Company B specific package | 🗑 | ⌄ |
| Fri, 26 Aug 2022 05:20:48 GMT | Create base XSD for OrderConfirmation (use a customer or AN test system example CXML as input) Create X12 XSD (or whatever is required to generate the X12 document)... | 🗑 | ⌄ |
| Thu, 02 Feb 2023 11:31:41 GMT | Repository containing artifacts like message map with order confirmation extrinsic map | 🗑 | ⌄ |
| Wed, 22 Feb 2023 04:46:18 GMT | Buyer Company F specific package | 🗑 | ⌄ |
| Tue, 27 Sep 2022 05:52:23 GMT | Base packages for all document types and formats | 🗑 | ⌄ |
| Thu, 21 Jul 2022 09:54:45 GMT | Integration suite trail example | 🗑 | ⌄ |
| Tue, 21 Feb 2023 11:32:45 GMT | This is a test package to check cxml to xsd conversion | 🗑 | ⌄ |
| Mon, 06 Feb 2023 08:11:39 GMT | Test package to check xsl to mmap | 🗑 | ⌄ |

From
FIG. 5A

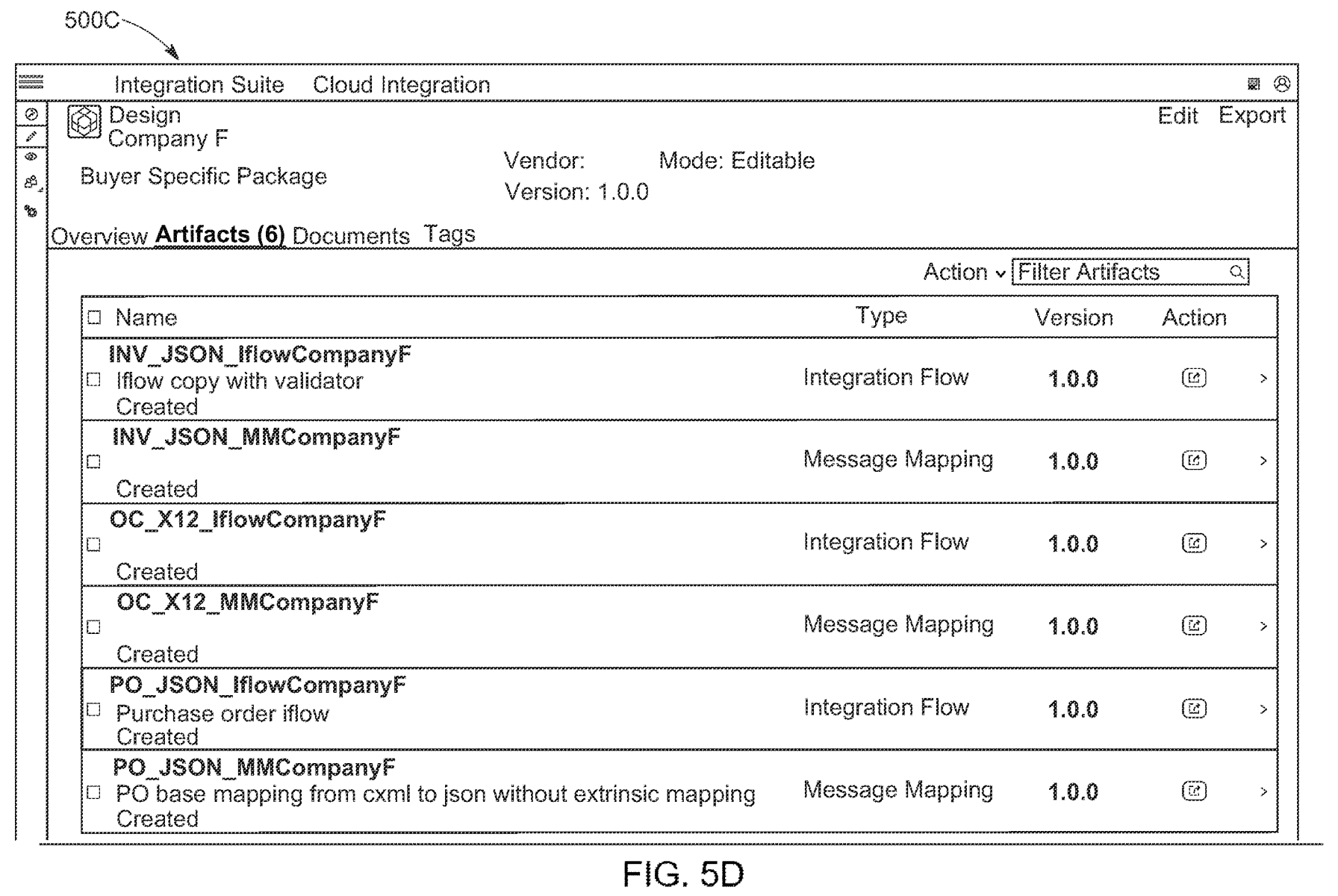

Integration Suite　Cloud Integration

Edit　Export

Design
Company F
　　　　　　　　Vendor:　　　Mode: Editable
Buyer Specific Package
　　　　　　　　Version: 1.0.0

Overview Artifacts (6) Documents　Tags

Action ˅ | Filter Artifacts

| Name | Type | Version | Action |
|---|---|---|---|
| INV_JSON_IflowCompanyF<br>Iflow copy with validator<br>Created | Integration Flow | 1.0.0 | ☑ ˄ |
| INV_JSON_MMCompanyF<br><br>Created | Message Mapping | 1.0.0 | ☑ ˄ |
| OC_X12_IflowCompanyF<br><br>Created | Integration Flow | 1.0.0 | ☑ ˄ |
| OC_X12_MMCompanyF<br><br>Created | Message Mapping | 1.0.0 | ☑ ˄ |
| PO_JSON_IflowCompanyF<br>Purchase order iflow<br>Created | Integration Flow | 1.0.0 | ☑ ˄ |
| PO_JSON_MMCompanyF<br>PO base mapping from cxml to json without extrinsic mapping<br>Created | Message Mapping | 1.0.0 | ☑ ˄ |

FIG. 5D

GENERATION OF INTEGRATION CONTENT FOR TRANSACTION NETWORKS

BACKGROUND

Transaction networks such as electronic marketplaces are becoming more and more prevalent places for buyers and sellers to conduct business. A transaction network may comprise a cloud-based business-to-business ("B2B") electronic marketplace where buyers and suppliers can locate each other and do business to engage in financial exchanges or transactions, for example, within a single networked platform. One such transaction network is SAP's Ariba Network™, an electronic marketplace through which billions of dollars of transactions are conducted on a daily basis.

A transaction network, for example, is a hosted service which enables suppliers and buyers to form relationships and conduct transactions over a network such as the Internet. Various information may be exchanged through a transaction network, such as orders, order confirmations, shipping information, and invoices, to name just a few types of information among many. A supplier may comprise an entity which offers the sale of various goods or services and a buyer may comprise an entity which desires to purchase one or more of the goods or services from the supplier. Various documentation, such as purchase orders and invoices, may be created for transactions conducted via a transaction network. "Documentation," as used herein, refers to one or more documents or other material which provides official information or evidence or that serves as a record of something, such as of a transaction.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 4A-F illustrate screenshots of a user interface which may be presented to a supplier requesting generation of an integration package according to an embodiment.

FIGS. 5A-H illustrate screenshots of a user interface which show adaptable features of integration packages for a middleware application according an to embodiment.

Figure 1:
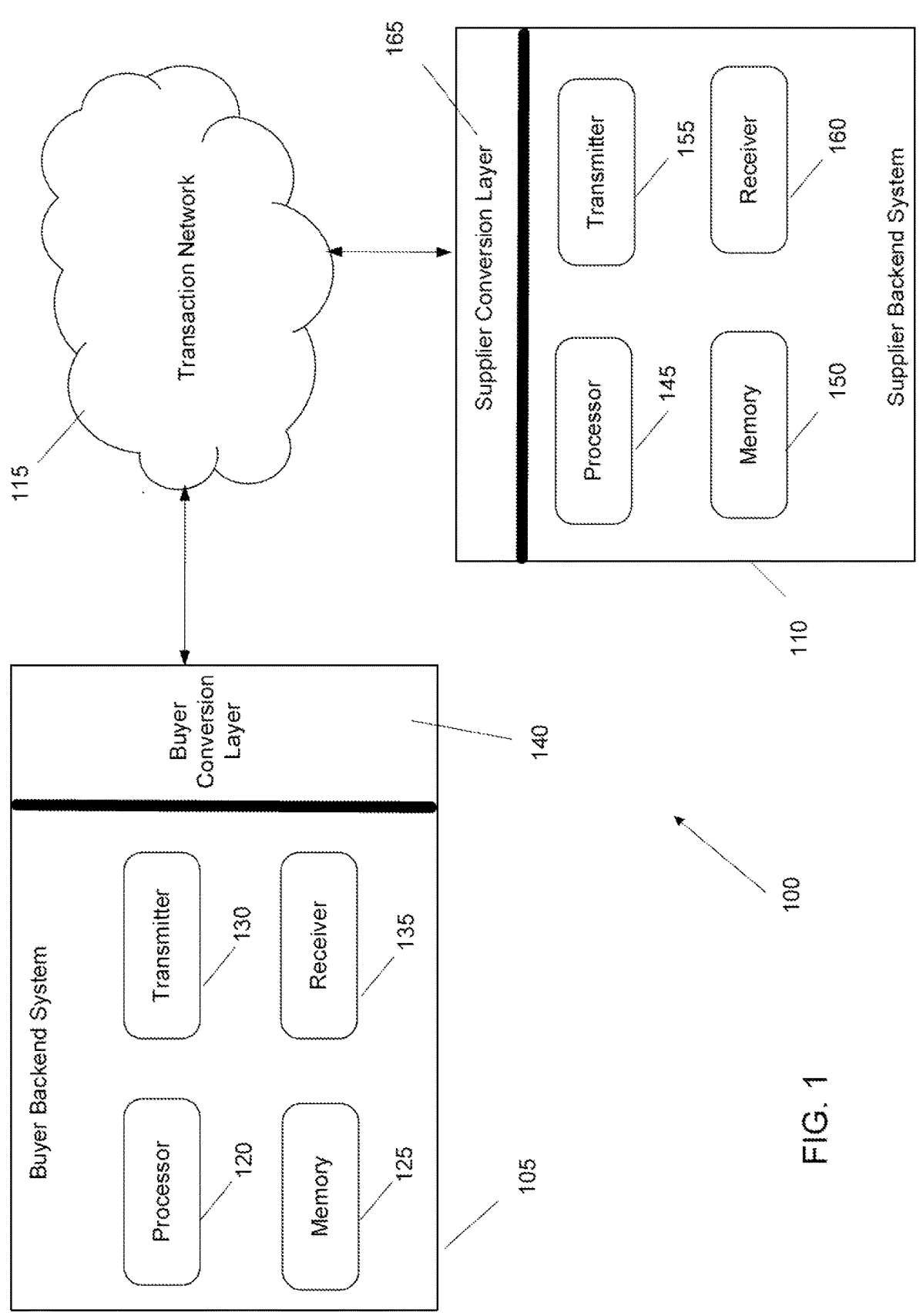
FIG. 1 illustrates an embodiment of a system in which a buyer backend system and a supplier backend system may engage in transactions via the use of a transaction network.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A transaction network may serve as a central exchange of information and documentation between buyers and suppliers. A buyer may generate a purchase order and transmit the purchase order to a supplier via the transaction network. If the buyer uses a specific type of documentation format for a purchase order or other documentation, the purchase order may be transformed from the buyer-specific format into a common format understood by the transaction network, such as extensible Markup Language (XML), commerce extensible Markup Language (cXML), or Electronic Data Interchange (EDI). A buyer-specific format may utilize buyer-specific XSD (fields and extrinsic), for example. cXML is a protocol for communication of documentation between procurement applications, e-commerce hubs and suppliers. cXML is based on XML and provides formal XML schemas for standard business transactions, allowing programs to modify and validate documentation without prior knowledge of their form. EDI comprises an electronic interchange of business information using a standardized format.

After a purchase order has been converted into cXML, for example, a supplier may view the purchase order via a user interface or portal of the transaction network. For example, the supplier may utilize the portal to approve the purchase order and generate an invoice for the transaction. However, if the supplier does a relatively large volume of transactions, such as thousands per day, it may be relatively cumbersome and time-consuming for the supplier to view each purchase order via a portal and generate invoices for each order via the portal. In some implementations, a supplier may receive a purchase order via the transaction network and may approve the purchase order, generate an invoice, and perform other related actions on the supplier's own backend system. Accordingly, instead of having to access a portal of the transaction network for each separate purchase order from a buyer, the supplier may instead perform various actions in order to complete a transaction relating to the purchase order directly on the supplier's own backend system.

For example, the supplier may generate invoices on its own backend system. The supplier may have its own Enterprise Resource Planning (ERP) system. An ERP system may manage day-to-day business activities such as accounting, procurement, project management, risk management and compliance, and supply chain operations. The supplier may push its generated documentation onto a transaction network. The supplier's backend system or ERP may generate documentation within a particular supplier-specific format. The documentation may need to be converted into a different format which the transaction network can understand. For example, such documentation generated by the supplier's backend system may be converted into a common or cXML format for use by the transaction network.

A process of converting or transforming between a supplier-specific format and a cXML format may be relatively complex. An end-to-end integration solution for suppliers on many transaction networks is not currently available. Accordingly, suppliers currently often utilize third-party integration solutions and/or providers to map their backend ERP systems to such a transaction network, adhering to buyer-specific requirements, which involves complex manual processes. For example, it may take months of coding and configuring to generate such a third-party integration solution for a particular supplier, potentially resulting in lost sales or otherwise introducing inefficiencies in processing transactions. The third-party may be provided with buyer-specific requirements which may include sample cXML documentation, Portable Document Format files (PDFs), and Excel or other spreadsheet specifications. The third-party may have integration specialists manually map and transform supplier backend formats to a buyer-specific cXML format on the transaction network. An integration specialist must reference cXML Document Type Definition (DTDs), find relevant fields out of huge set of fields in the specification and finally use a middleware to perform mappings and transformations. However, for a particular supplier, each new buyer integration (e.g., for the supplier to transact with the new buyer) may take up to 24 weeks in some instances because an integration specialist is required to understand buyer-specific requirements, such as code list conversions (e.g., UoM, Category Code, Tax Values etc.), field semantics, custom fields, rules on network, may adapt existing code and processes, and may incorporate other buyer-specific requirements in order to successfully integrate.

Buyers of goods and services may conduct transactions with suppliers of the goods and services over a business-to-business transaction network such as SAP's Ariba Network™. A "buyer," as used herein, refers to a person or business entity which desires to purchase goods and/or services over a transaction network. The goods may comprise items such as office supplies, raw materials, or any other item which a person or entity may desire to purchase. The services may comprise accounting services, legal services, or any other type of act or use for which a consumer, firm, or government is willing to pay. A "supplier," as used herein refers to a person or business entity which offers one or goods or services for sale, such as over a transaction network.

A supplier may have an existing relationship with a customer or buyer who invites the supplier to form a relationship on the transaction network. A buyer may use the transaction network to enable electronic processing of orders and invoices with the buyer's existing suppliers. The buyer may also search for new suppliers. After a supplier accepts an invitation from a buyer, the buyer may view the supplier's catalogs of goods and services being offered for sale and may place orders. Suppliers may receive the orders and may create and send order confirmations, advance ship notices, and invoices if the suppliers accepts the orders from the buyers. The buyer may subsequently send payment documentation (e.g., regarding remittances) to the supplier to provide a record of a payment transfer, for example.

A supplier may use a transaction network to access high-volume buying organizations, connect with specific buying organizations that are interested in the supplier's products or services, publish catalogs containing information and pricing that is customized for specific customers, categorize products and services so that customers or buyers can find these products or services when searching by category, or select a routing method for documentation which best fits the supplier's business needs. Suppliers may receive documentation relating to one or more transactions via various mechanisms such as email, fax, online (e.g., using a transaction network inbox and outbox), cXML, or Electronic Data Interchange (EDI). Suppliers may send documentation from an online outbox or through cXML or EDI. A supplier may conduct transactions electronically by sending purchase order confirmations, invoices, and other documentation. A transaction network may enable or provide fast transmission, tracking, and processing of transactions.

When suppliers set up an account on a transaction network, the suppliers may provide extensive information about their company, from the company address to specific business policies. To communicate product and service offerings to buying organizations, suppliers may store catalogs on the transaction network using one of several different formats. Alternatively, suppliers may specify a link which enables potential buyers or customers to punch out from their procurement systems to their website and shop for products and services there.

Buyers may have their own backend systems which may generate and send documentation, such as that relating to what goods or services they want to buy. Such documentation may include purchase orders or updated purchase orders. A supplier may receive a purchase order from a buyer via a transaction network. The supplier may accept or reject a purchase order, or may request that the purchase order be modified. A buyer and a supplier may have an established relationship prior to the submission of a purchase order. For example, a buyer may search for a supplier and may request a trading relationship with a supplier. The supplier may receive the request and, if the supplier accepts the request, a trading relationship may be established between the buyer and the supplier. The supplier may subsequently exchange a catalog of the supplier's goods or services with the buyer. The buyer may thereafter purchase goods or services from the supplier's catalog via the transaction network. The buyer may also purchase other items, known as "non-catalog items," from the buyer, even though such items are not listed within the supplier's catalog, for example. An item such as pencils may be considered a catalog item, whereas copper or other raw materials which are used for the manufacture of certain products may be considered a non-catalog item in some situations.

In accordance with an embodiment, a buyer may use a backend system to generate a purchase order and may transmit the purchase order to a transaction network. A supplier may log into a user interface, such as a portal, on the transaction network to view the purchase order. If the supplier agrees to a transaction requested or proposed via the purchase order, the supplier may thereafter utilize the portal to send an invoice to the buyer via the transaction network Such a process, however, is cumbersome because if a supplier receives many purchase orders from a buyer's backend, the supplier may end of spending a fairly large amount of time reviewing purchase orders via the portal and initiating the transmission of invoices. For example, if a supplier is doing a high volume of transactions, it may be laborious for the supplier to have to use the portal to view numerous purchase orders and create invoices. Instead, suppliers may prefer to do business on their own backend systems and then transmit or enable documentation relating to transactions to flow through the transaction network to buyers.

The transaction network may provide suppliers with an ability to conduct transactions within their own backend system. For example, a supplier's backend system may receive a purchase order from a buyer via the transaction network and may generate an invoice relating to the purchase order. After generating the invoice and/or other related documentation, such documentation may be transmitted to or may otherwise flow from the supplier's backend system to the transaction network.

A backend system of a supplier may comprise an ERP system. An ERP system may manage day-to-day business activities such as accounting, procurement, project management, risk management and compliance, and supply chain operations. The supplier's backend system may push or transmit generated invoices onto the transaction network. The supplier's backend system may generate documentation in a format specific to the supplier, such as EDI, Intermediate Document (iDoc), JavaScript Object Notation (JSON), or Extensible Markup Language (XML), for example. Documentation which is in a format specific to a backend system for a supplier may need to be converted into a format which the transaction network can understand. For example, such backend documentation may be converted into a common format, such as cXML, for use by the transaction network.

There may be two types of suppliers on the transaction network, "integrated" and "non-integrated" suppliers. A "non-integrated supplier," as used herein, refers to a supplier who uses a user interface or portal of the transaction network to view a purchase order, send an invoice, and/or otherwise perform actions relating to transactions, for example. An "integrated supplier," as used herein, refers to a supplier who conducts transactions within the supplier's own backend system. After conducting a transaction, such as agreeing to the terms of a purchase order, an integrated supplier may generate an invoice within a particular format used by the supplier's own backend system, and may transmit or otherwise allow the invoice and/or other documentation to flow from the supplier's backend system to the transaction network through one or more exchange layers. A relatively small supplier may choose to be non-integrated because the non-integrated supplier may lack the resources to become integrated and handle transactions on their own backend. For example, a relatively small supplier might not have resources for a complex ERP system.

FIG. 1 illustrates an embodiment 100 of a system in which a buyer backend system 105 and a supplier backend system 110 may engage in transactions via the use of a transaction network 115. Although only one buyer backend system 105 and one supplier backend system 110 are shown in embodiment 100, it should be appreciated that many backend systems for different buyers and suppliers may engage in transactions via the use of the transaction network 115. A buyer or supplier may interact with the transaction network 115 via the use of an application running on or executed by a computer or terminal device, for example.

In embodiment 100, buyer backend system 105 may include a processor 120, a memory 125 or storage device, a transmitter 130, and a receiver 135. Buyer backend system 105 may generate a purchase order, for example, within a format specific to the buyer's backend system. The purchase order may be provided to the transaction network 115 which may enable the purchase order to flow to the supplier backend system 110. However, prior to providing the purchase order from the buyer backend system 105 to the transaction network 115, the purchase order may be converted into a common format for use or dissemination by the transaction network 115, as discussed above, such as the cXML format. In embodiment 100, a buyer conversion layer 140 may be utilized to convert a purchase order or other documentation from a buyer-specific format into a common format such as cXML. After converting a purchase order onto a common format such as cXML, the purchase order may flow from buyer backend system 105 to the transaction network 115. The transaction network 115 may, in turn, enable the purchase order and/or other documentation to flow to supplier backend system 110.

Supplier backend system 110 may include a processor 145, a memory 150 or storage device, a transmitter 155, and a receiver 160. Supplier backend system 110 may receive a purchase order in a common format, such as cXML, from the transaction network 115. In some embodiments, a supplier conversion layer 165 may convert documentation received from the transaction network 115, such as a purchase order or some other documentation, into a supplier-specific format. A supplier backend system 110 may process a received purchase order and, if the terms of the purchase order are accepted, the supplier backend system 110 may generate an invoice and/or other documentation within the supplier-specific format. Supplier conversion layer 165 may convert an invoice and/or other documentation from the supplier-specific format into a common format adhering to buyer rules and field semantics for dissemination by the transaction network 115, such as the cXML format. Upon receiving an invoice or other documentation from supplier backend system 110, the transaction network 115 may enable or permit the invoice or other documentation to flow to buyer backend system 105, for example.

A buyer may utilize an integration middleware, such as the Cloud Integration Gateway™ (CIG) offered by SAP™, within a buyer backend system exchange layer in order to convert documentation from a buyer-specific format into a common format, such as cXML, for dissemination by the transaction network. An integration middleware may assist buyers or customers by converting cXML format into a proprietary format, such as iDoc, an XML-based format. An integration middleware may be used by buyers who have certain types of backend systems such as SAP ERP™ or S/4 HANA™.

Although an integration middleware may be useful for many buyers, the integration middleware may have relatively limited capabilities for performing conversions on a supplier's backend system. For example, the integration middleware may only have an ability to perform 5% of conversations or transformations, for example, needed to transform documentation from a common format, such as cXML, into a buyer-specific format. Custom transformations may be required which may not be capable of being performed with the integration middleware.

An embodiment, as discussed herein, comprises a middleware layer capable of performing transformations from a supplier-specific format into a common format, such as cXML. An embodiment may generate dynamic integration content utilizing a middleware application, such as Cloud Integration (CPI)™ offered by SAP™. Capabilities and buyer-specific information may be automatically collected from the middleware used by the buyers and transaction network to provide an end-to-end solution for supplier integration. The middleware application may be cloud-based and may connect a supplier's ERP systems with third-party products. An embodiment may substantially reduce an amount of time to integrate a supplier because the supplier will no longer be dependent on manual collaboration with a buyer for most integration tasks. EDI and cXML, for example, are widely used protocols for exchanging business documentation electronically and both define standard documentation structures for a variety of documentation. Based on these standard definitions, an embodiment discussed herein may deliver most field mappings and transformations between documentation within a supplier-specific format and documentation within a buyer-specific format as a base package. Base packages for different industries or countries, for example, may be created based upon best practices. If a supplier(s) uses other protocols or formats, the supplier may generate a base package specific to the supplier's needs.

An integration middleware may contain custom buyer-specific XSD, and a transaction network may contain buyer-specific rules. Alternatively, it may also be possible to generate buyer-specific XSD in a transaction network 115 based on transactions. A supplier may be provided with a wizard interface on the transaction network which superimposes buyer-specific XSD and rules onto base integration content (e.g., message mappings) and may generate a buyer-specific integration package. The buyer-specific integration package is utilized to perform a transformation of documentation from a supplier-specific format into a buyer-specific format, for example. The supplier may view a particular integration package to see details relating to transformations between documentation formats and/or to make additional modifications to such transformations. A supplier may be provided with an almost ready-to-use integration package and may utilize message mapping and transformation capabilities of the middleware application to further adjust and refine the mappings in a self-service low-code no-code environment, as discussed in more detail below with respect to FIGS. 5A-5H. The middleware application may cater to simple or very complex transformation requirements specific to a buyer being integrated. An integration package created for one buyer can be re-used for other buyers, reducing an effort required for subsequent integrations. Buyers with similar requirements may be grouped into a single middleware application integration package as well. A supplier may also configure connections for an end-to-end integration solution.

Currently, suppliers either use a third party or perform custom development to perform mappings for transformations between the supplier's backend system format and a common format used on a transaction network, such as cXML. However, such mappings may be relatively complex and may take months to complete for each buyer with which the supplier desires to transact. For example, although the supplier's format is converted into a cXML format for dissemination by the transaction network, the cXML format may need to incorporate certain fields or other formatting items for a buyer-specific format so that when certain documentation is transformed from cXML into the buyer-specific format, the documentation contains all of the fields or other information required by the buyer-specific format of the buyer's backend system.

cXML is an open format which may have any number of custom fields. Although there is a certain fixed structure, such as with 10000+ standard fields in cXML, the structure is also extensible with any number of custom fields/semantics. Documentation relating to a transaction may potentially have many standard fields, the semantics of which may be different for different buyers. Such documentation may also include potentially 200 custom fields which may also differ among buyers. If a supplier wants to connect to the transaction network 115, the supplier cannot simply use a single cXML format for documentation to be sent to all buyers. Instead, the supplier may provide documentation in a cXML format which includes all of the fields which a particular buyer uses in the buyer's own specific backend system format. In the event that a supplier engages in transactions with hundreds or even thousands of different buyers, it may be particularly burdensome to perform mappings between the supplier-specific format and a cXML format which contains all of the fields which a buyer uses in its own particular backend system format.

A supplier may need to understand the semantics of the fields of a buyer-specific format. Accordingly, a supplier conversion layer 165 of supplier backend system 110 may need to be sophisticated enough to have knowledge of all of the particulars of a buyer's specific format in order to properly convert documentation in the supplier-specific format into a cXML format which may subsequently be converted by a buyer conversion layer 140 into a buyer-specific format which includes all of the fields which are used by a particular buyer. There may also be potentially hundreds of different rules which a buyer may set up for documentation to be sent to the buyer. A supplier may need to account for all of the standard fields, custom fields, and rules which may be used by a particular buyer's backend system. Use of such standard fields, custom fields, and buyer-specific rules may make transformations or mapping between a supplier-specific format and a buyer-specific format relatively complex.

Moreover, even if a supplier does use middleware provided by a third party or perform custom backend customization, the supplier still needs to reach out to the buyer to determine what the buyer's schema is and which rules are used by the buyer. Such information may be provided via an email or by providing the buyer with access to a user interface or portal in which the buyer may supply the requested information. However, having to contact the buyer in this way requires additional manual, not automated, processing and may be burdensome on each buyer as well as on the supplier.

Figure 2:
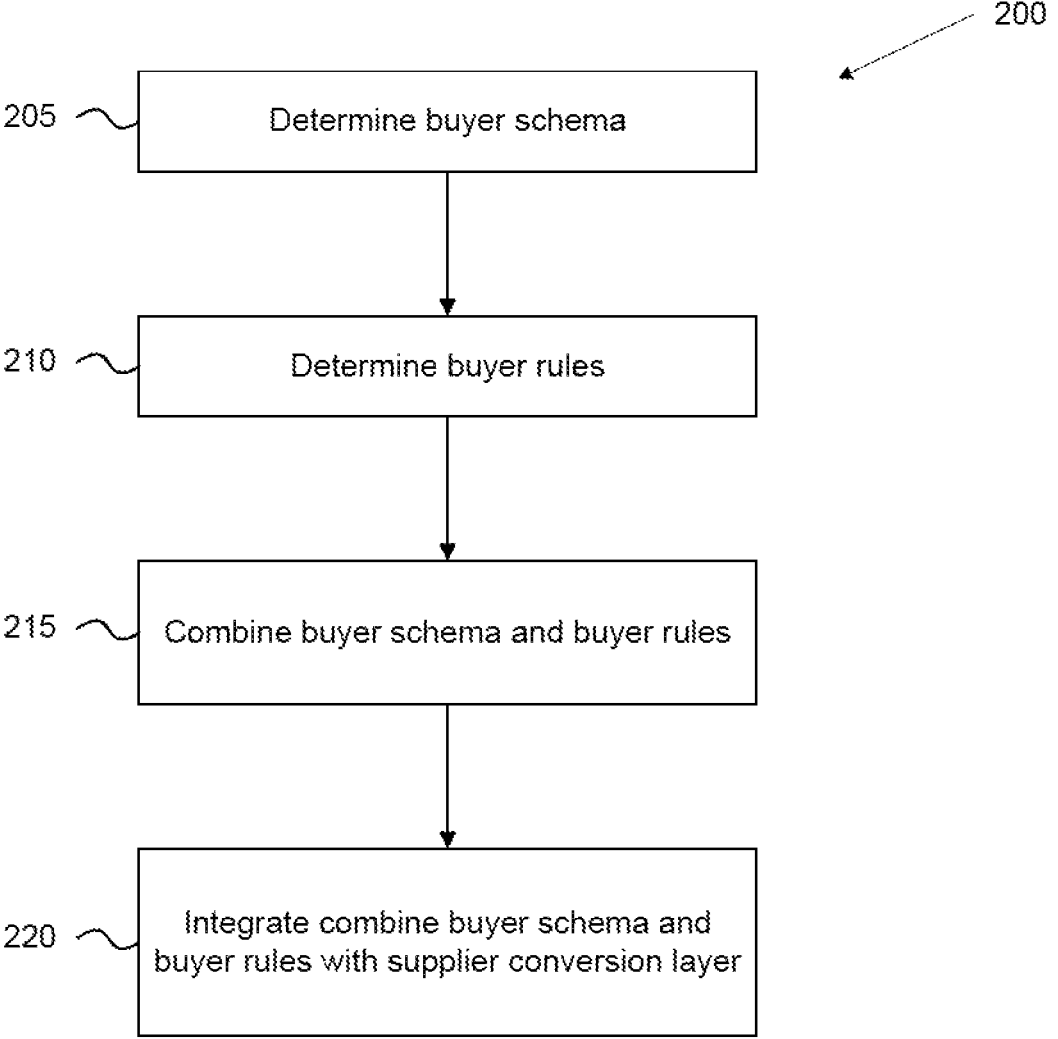
FIG. 2 illustrates an embodiment of a flowchart of a process for automatically determining a buyer's schema and rules and integrating the buyer's schema and rules with a supplier conversion layer.

FIG. 2 illustrates an embodiment of a flowchart 200 of a process for automatically determining a buyer's schema rules and integrating the buyer's schema and rules with a supplier conversion layer. Embodiments in accordance with claimed subject matter may include all of, less than, or more than blocks 205 through 220. Also, the order of blocks 205 through 220 is merely an example order. For example, a method in accordance with embodiment 200 may be performed by a computing device having one or more processors, such as a server.

At operation 205, a buyer schema may be determined. A "schema," as used herein, refers to an organization or structure for documentation or a database. For example, a buyer schema may be automatically generated so that a buyer and a supplier do not have to negotiate through emails and/or a portal to identify which fields and which structures the buyer accepts. Instead, the buyer schema may be determined automatically from information which is already available on the transaction network. If a buyer is already integrated through an integration middleware, a buyer schema may be generated from the integration middleware based on what the buyer structure looks like. The use of an integration middleware may be limited, for example, because the integration middleware might only support certain types of ERP backend systems. However, there may be other buyers which have backend systems which are not supported by the integration middleware even though those buyers also connect to the transaction network. Accordingly, information from a limited set of buyers (those who have certain supported backend systems) may be acquired from an integration middleware.

Another way of determining or acquiring information about a particular buyer's schema is to inspect or analyze transactions which are flowing through the transaction network. For example, if purchase orders are flowing into the transaction network from a buyer for multiple suppliers, a certain number of the most recent purchase orders, such as the 100 most recent purchase orders, may be analyzed or processed to infer or generate a buyer schema from of the documentation. In accordance with an embodiment, documentation which is in a cXML format may be processed to determine to an Extensible Markup Language (XML) Schema Definition (XSD). For example, cXML refers to the actual data for documentation, whereas XSD refers to the schema which represents that data. If there are potentially 10,000 available standard fields and 200 custom fields, a particular buyer might only be using 1,000 of these fields in its own buyer-specific documentation. By analyzing a set of documentation recently generated by the buyer and provided to the transaction network, the fields which are actually being used by the buyer in a documentation set may be identified. Structures of the plurality of items of documentation may be processed in case some particular documentation does not use a field, whereas other documentation does use that field. If a superset of 100 items of documentation is analyzed, every field which is used in the set of documentation may be identified and may be used to determine how to transform documentation into a format which accounts for the buyer-specific fields.

An additional way of determining which fields are used by a buyer is to identify these fields via a manual collaboration. However, as discussed above, such a manual collaboration process requires a negotiation between a buyer and a supplier and is relatively labor- and time-intensive.

After a buyer schema has been determined, the supplier may next determine the buyer's rules. Referring back to FIG. 2, at operation 210, a buyer's rules may be determined. The buyer rules may indicate which structures the buyer accepts or that the buyer will send. Rules may relate to the type of invoices, shipping notices, and other documentation which the buyer accepts, for example. A buyer may configure these rules via the transaction network, such as via a portal or user interface. Any supplier who is integrated with a buyer may see which rules are specific to the buyer via a portal or user interface of the transaction network, for example. There are different ways in which the supplier may determine the buyer's rules. In one particular implementation, various documentation flowing through the transaction network 115 which relate to the buyer may be analyzed to infer or otherwise identify rules relating to different types of documentation created by the buyer and/or accepted by the buyer. For example, the buyer-specific rules may be inferred by analyzing a superset of documentation created by the buyer and/or accepted by the buyer in accordance with a process similar to that discussed above in which the buyer's schema is determined. For example, the previous 100 purchase orders created by the buyer's backend system 105 and transmitted to the transaction network 115 may be analyzed to identify common structures utilized within the purchase orders. Similarly, the previous 100 invoices transmitted by one or more supplier backend systems 110 to the transaction network 115 and accepted by the buyer backend system 105 may be analyzed or processed to identify common structures utilized within the invoices. A similar process may be performed on other types of documentation generated by and/or accepted by the buyer backend system 105 to infer buyer-specific rules for other types of documentation, in accordance with a particular embodiment.

Another way in which buyer-specific rules may be determined by the supplier relates to buyers which are integrated through an integration middleware. For example, if a particular buyer uses a certain type of ERP backend system, the buyer's rules may be obtained from the integration middleware in accordance with a process similar to how the buyer schema may be determined as discussed above with respect to operation 205. Accordingly, buyer-specific rules for a limited set of buyers (those who have certain supported backend systems) may be acquired from an integration middleware.

There are multiple levels of rules for a buyer in accordance with a particular implementation. A first level of rules may comprise general rules which apply to all suppliers. A second level of rules may comprise rules for a group of suppliers, such as suppliers within a particular industry. A third level of rules may comprise country-specific rules. A fourth level of rules may comprise rules for a specific supplier. The rules may relate to information such as requirements relating to an estimated shipping date to list on an order confirmation, an actual or estimated shipping date to list on ship notices, a ship notice type to list on ship notices, tax-related information, a, unique serial number to list on purchase order, a package shipping identifier (ID), a prohibition on allowing multiple date notifications for a single shipment, the use of a unique package shipment ID, to name just a few examples among many. In one particular example, the rules may be used to indicate which information is to be listed by a supplier on certain types of documentation, such as invoices.

Figure 7:
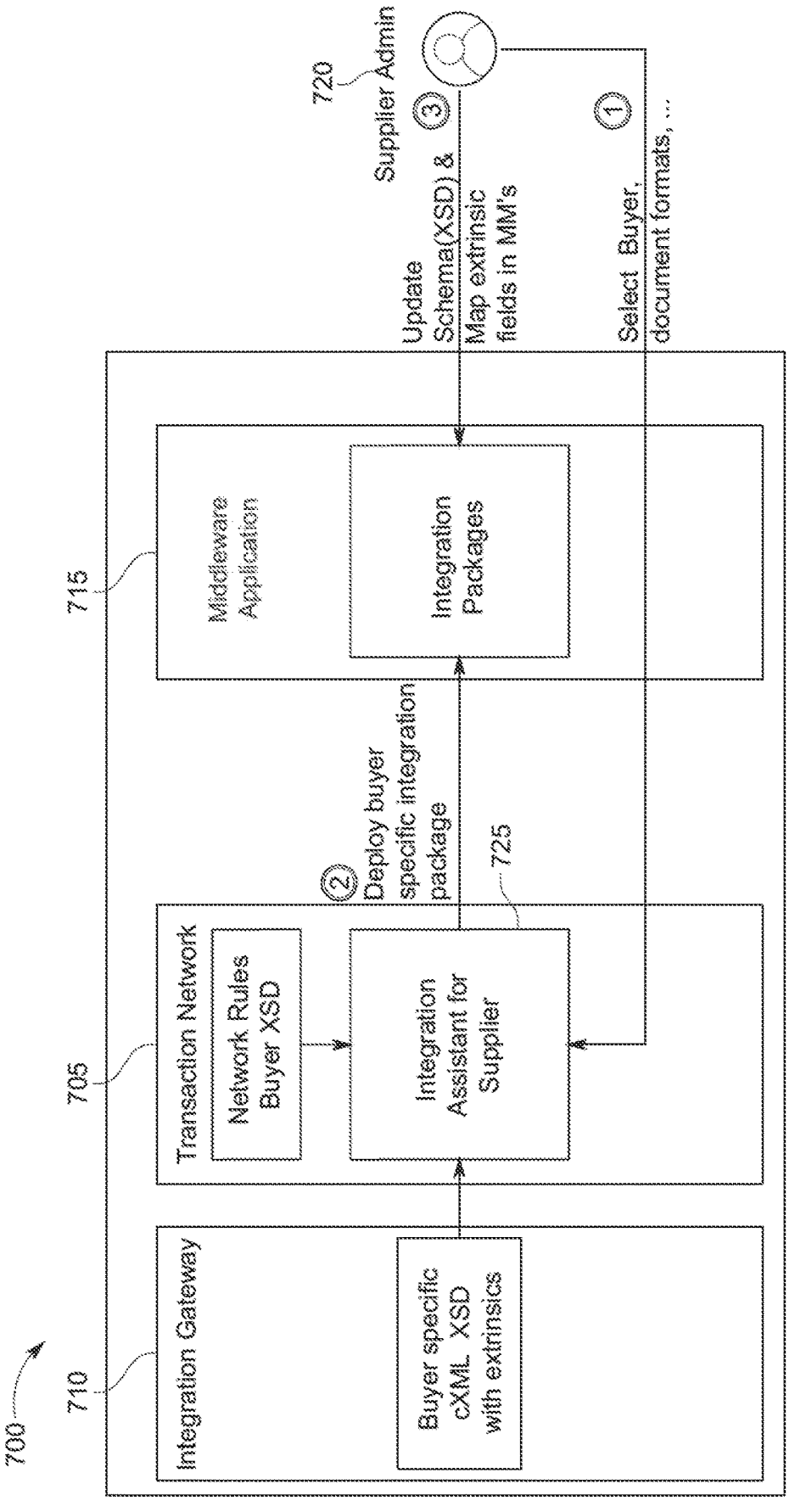
FIG. 7 illustrates an embodiment of an architecture of a system at design time.

Next, at operation 215, the buyer schema may be combined or integrated with the buyer rules. For example, an integration assistant for the supplier, such as is shown in FIG. 7 described below, may combine buyer-specific schema and rules to create a single temporary XSD file. One XSD file may be created for each format and documentation type (e.g., invoice, shipping notice, etc.) for a supplier.

At operation 220, the combined buyer schema and buyer rules may be integrated with the supplier conversion layer of a particular supplier, such as through the use of a middleware application. For example, this integration process may be performed in order to make the combined buyer schema and rules available to the supplier for integration on the supplier's backend system. For example, the integration assistant for the supplier may generate a buyer-specific integration package which may be deployed into the middleware application, such as is described below with respect to FIG. 7. An integration package may comprise a file, such as a ZIP file, containing various artifacts such as XSD files, message mappings, iFlows, Java/Groovy source code files, or Java archive (JAR) files, to name just a few examples among many. An iFlow is an integration artifact which enables a specification of how a message is processed on a tenant. As such, an iFlow may be viewed as a cross-system process which is executed to process messages in a particular way based on an underlying integration scenario.

An artifact is a byproduct of software development that helps describe the architecture, design and function of software. Artifacts may be considered roadmaps which software developers may use to trace the entire software development process. Artifacts may be used to allow systems to connect to each other. A message mapping refers to a mapping of one message format to another message format. Message mapping may be supported by a graphical mapping editor. Message mapping, for example, supports standard XML as well as cXML. Supported types may include XML Schema Definitions (XSD), OData V2/V4 metadata files with .edmx or .xml extensions, and Web Services Description Language (WSDL), to name just a few examples.

In order to generate and deploy an integration package, a standard or otherwise currently existing integration package may initially be accessed or copied and certain fields and/or files within the standard or otherwise currently existing integration package may be replaced with supplier-specific files and rules, such as those determined in operations 205 and 210. The integration assistant for the supplier may thereafter create a new file archive, such as a ZIP file archive. After the new file archive has been created, the artifacts may be uploaded to the integration middleware, such as is shown below in FIG. 7, through the use of Application Programming Interfaces (APIs). Several APIs may be called to create an iFlow and a message map per document type/format.

The middleware application may be accessed via a portal or user interface. The middleware application may present an integration flow (iFlow) to an administrator of a supplier, for example.

Figure 3:
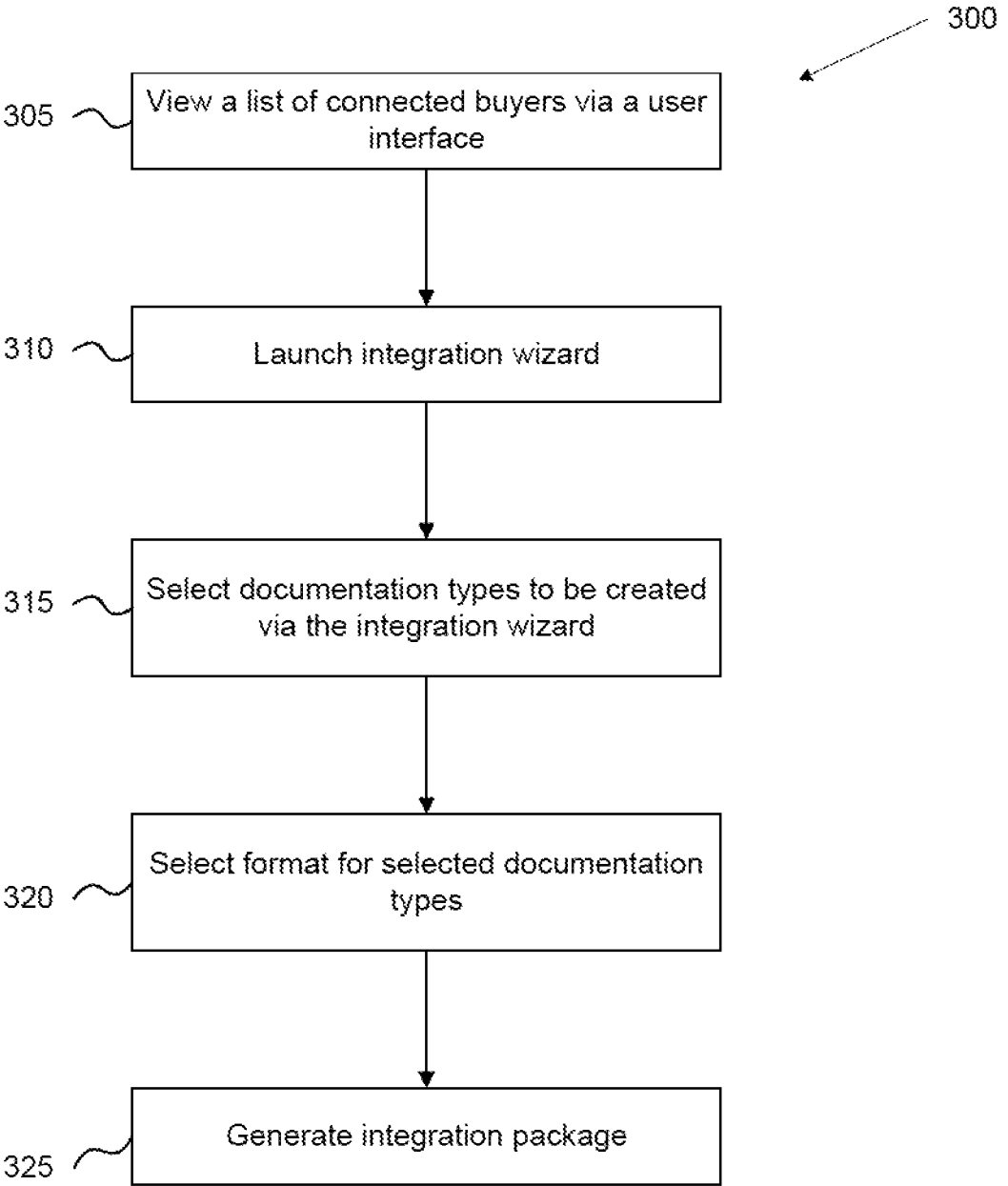
FIG. 3 illustrates an embodiment of a flowchart of a process for a supplier to utilize a user interface to determine and integrate a buyer's schema and rules with the supplier's backend system.

FIG. 3 illustrates an embodiment of a flowchart 300 of a process for a supplier to utilize a user interface to determine and integrate a buyer's schema and rules with the supplier's backend system. Embodiments in accordance with claimed subject matter may include all of, less than, or more than blocks 305 through 325. Also, the order of blocks 305 through 325 is merely an example order. For example, a method in accordance with embodiment 300 may be performed by a computing device having one or more processors, such as a server.

At operation 305, a supplier may view a list of connected buyers via a user interface or portal. For example, the supplier may be logged in to the transaction network to view such a user interface.

Figure 4B:
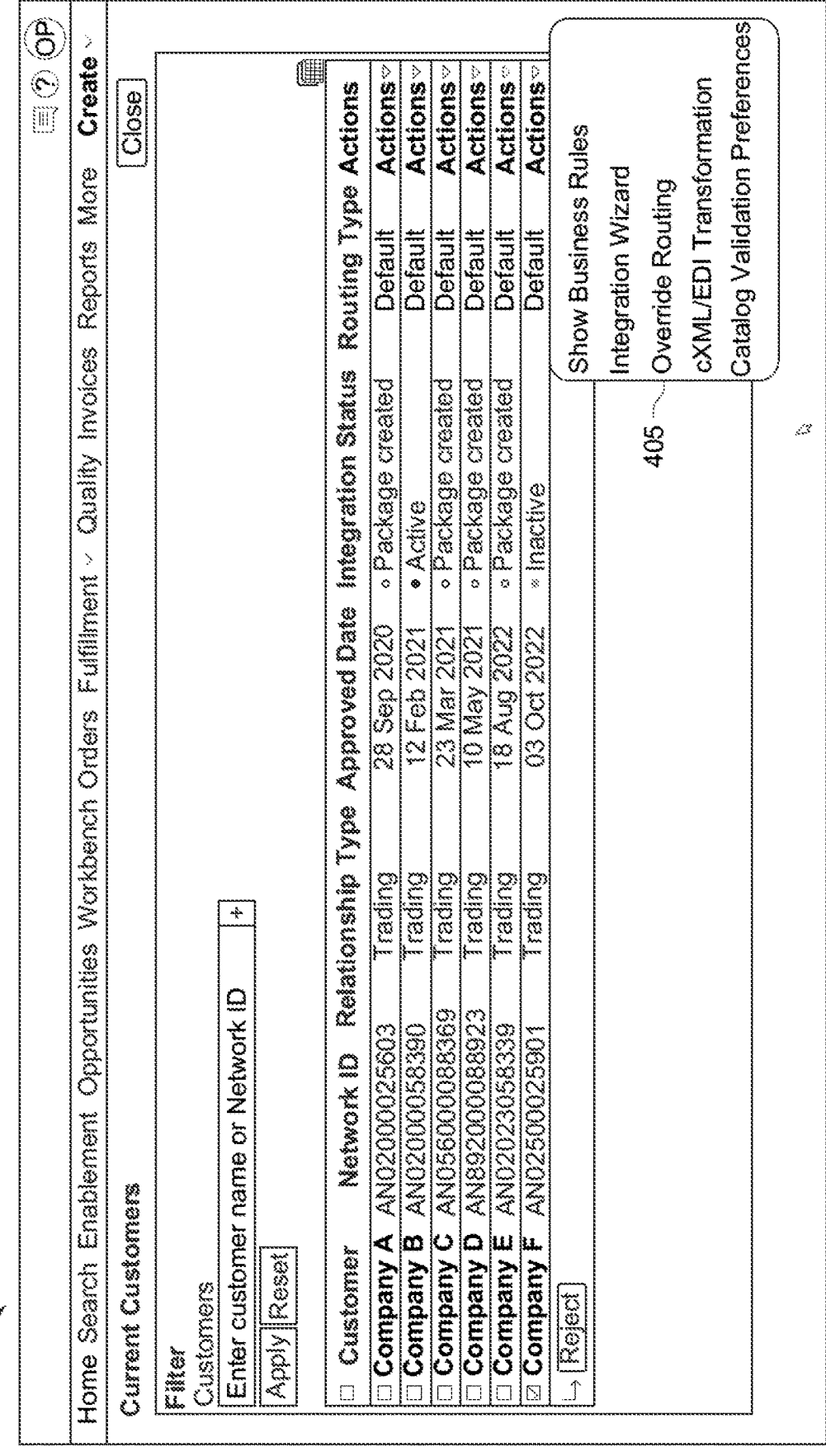

FIG. 4A illustrates a screenshot 400A of a user interface which may be presented to a supplier according to an embodiment. For example, screenshot 400A may list information regarding existing buyers or customers of the supplier who are connected with the transaction network. Screenshot 400A lists various columns of information such as "Customer," "Network ID," "Relationship Type," "Approved Date," "Integration Status," "Routing Type," and "Actions." The names of different integrated customers or buyers are listed under the "Customer" column, such as Customer A, Customer B, Customer C, Customer D, Customer E, and Customer F. Although information for six customers is shown in screenshot 400A, it should be appreciated that information for more (or fewer) than six customers may be displayed in various implementations. Identifiers (IDs) for each of the different customers may be displayed under the "Network ID" column. For example, such IDs may refer to a transaction network ID for each customer. Information indicating a relationship between each customer and the supplier may be shown in the "Relationship Type" column. In this case, each customer is listed as having a "Trading" type of relationship with the supplier. A different type such as "Sourcing" may be listed under "Relationship Type" for certain customers in some implementations. The date on which a business relationship with each customer and the supplier were initiated may be listed under the "approved Date" column of screen shot 400A. The "Integration Status" column may indicate whether the schema and rules for a particular customer or buyer have been integrated with the supplier's backend system. As shown in screenshot 400A, Companies A and C-E are listed as having "package created," to indicate that the schema and rules for each of these companies have been created but are not yet integrated with the supplier's backend system. Company B is listed as having an "Active" integration status, indicating that the schema and rules for Company B have been integrated with the supplier's backend system. Transactions and/or documents may flow between supplier and buyer backend systems when the status is "Active," for example. Company F is listed as being "Inactive," indicating that the schema and rules for Company F have not been integrated with the supplier's backend system. An "Actions" column shown in screenshot 400A may include dropdown windows showing available actions which a supplier may take regarding a particular customer, as discussed in more detail below with respect to FIG. 4B.

Referring back to FIG. 3, at operation 310, a supplier may select an option to launch an integration wizard for a customer. FIG. 4B is an illustration of a screenshot 400B of a user interface which may be presented to a supplier according to an embodiment. As shown, a supplier may select an "Actions" drop down menu in the "Action" column for Company F in the "Customer" row shown in screenshot 400A of FIG. 4A to display a dropdown window 405 shown in screenshot 400B of FIG. 4B. Dropdown window 405 may display options such as "Show Business Rules," "Integration Wizard," "Override Routing," "cXML/EDI Transformation," and "Catalog Validation preferences." The supplier may select any of the displayed options in dropdown menu 405. If, for example, "Integration Wizard" is selected, such as via use of a mouse via a point-and-click operation, an Integration Wizard may be displayed. A "wizard," or "software wizard," as used herein, refers to a user interface which leads a user through a sequence of small steps, such as a dialog box to configure a program for the first time. A complex, rare, or unfamiliar task may be easier with a wizard that breaks the task into simpler pieces.

Figure 4C:
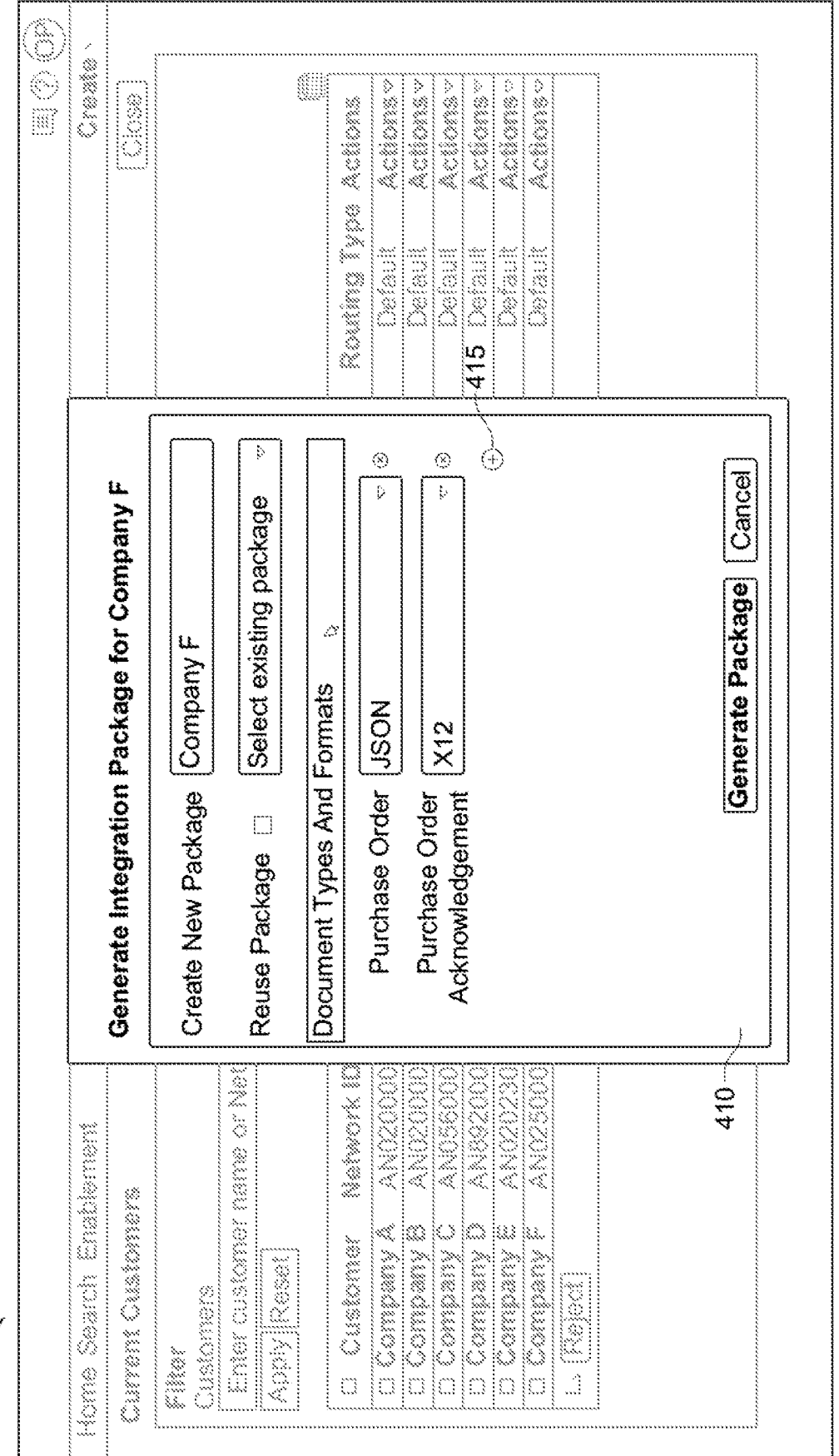

FIG. 4C is an illustration of a screenshot 400C of a user interface which may be presented to a supplier according to an embodiment. As illustrated, screenshot 400C may display an integration wizard 410 which enables a supplier to select a type of integration package to be generated for a particular customer or buyer. In this example, the supplier has selected to generate an integration package for Company F. The supplier may select documentation types and formats to be generated for Company F, such as a JSON format for a purchase order and X12 format for a purchase order acknowledgement. The supplier may also select a "+" icon 415 to generate an additional type of documentation.

Figure 4D:
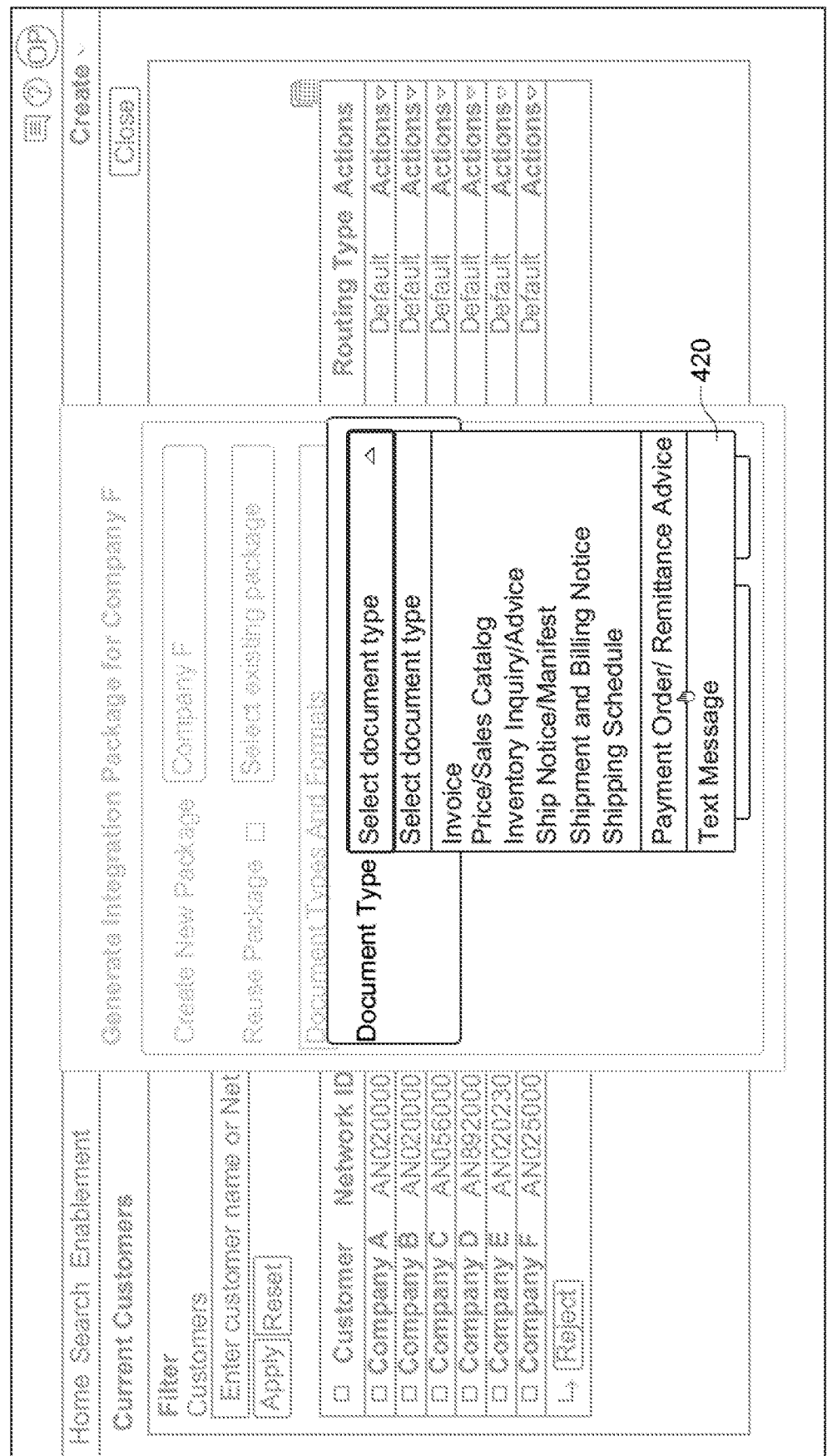

Referring back to FIG. 3, at operation 315, a supplier may select a documentation type to be created for a selected customer or buyer via an integration wizard. FIG. 4D is an illustration of a screenshot 400D of a user interface which may be presented to a supplier according to an embodiment. If a supplier selects the "+" icon 415 shown in screenshot 400C of FIG. 4C, a dropdown menu 420 may be displayed, such as is shown in screenshot 400D of FIG. 4D. Dropdown menu 420 may include selectable options for a documentation type to be created, such as "Invoice," "Price/Sales Catalog," "Inventory Inquiry/Advice," "Ship Notice/Manifest," "Shipment and Billing Notice," "Shipping Schedule," "Payment Order/Remittance Advice," and "Text Message," to name just a few, among many, possible documentation type options which may be displayed to the supplier. In accordance with an embodiment, other documentation type options may include purchase orders, functional acknowledgements, order confirmations, time sheets, order response documentation, payment proposals, status update requests, transport requests, transport confirmations, copy documentation (such as copy orders, copy confirmation, copy ship notices, and copy approvals), and quality-related documentation (such as quality notification documentation, quality inspection requests, and quality inspection decision requests).

If, for example, the supplier selects the "Invoice" option, the documentation type may be added to the wizard and the supplier may choose the format from a dropdown menu, as discussed below with respect to FIG. 4E.

Figure 4E:
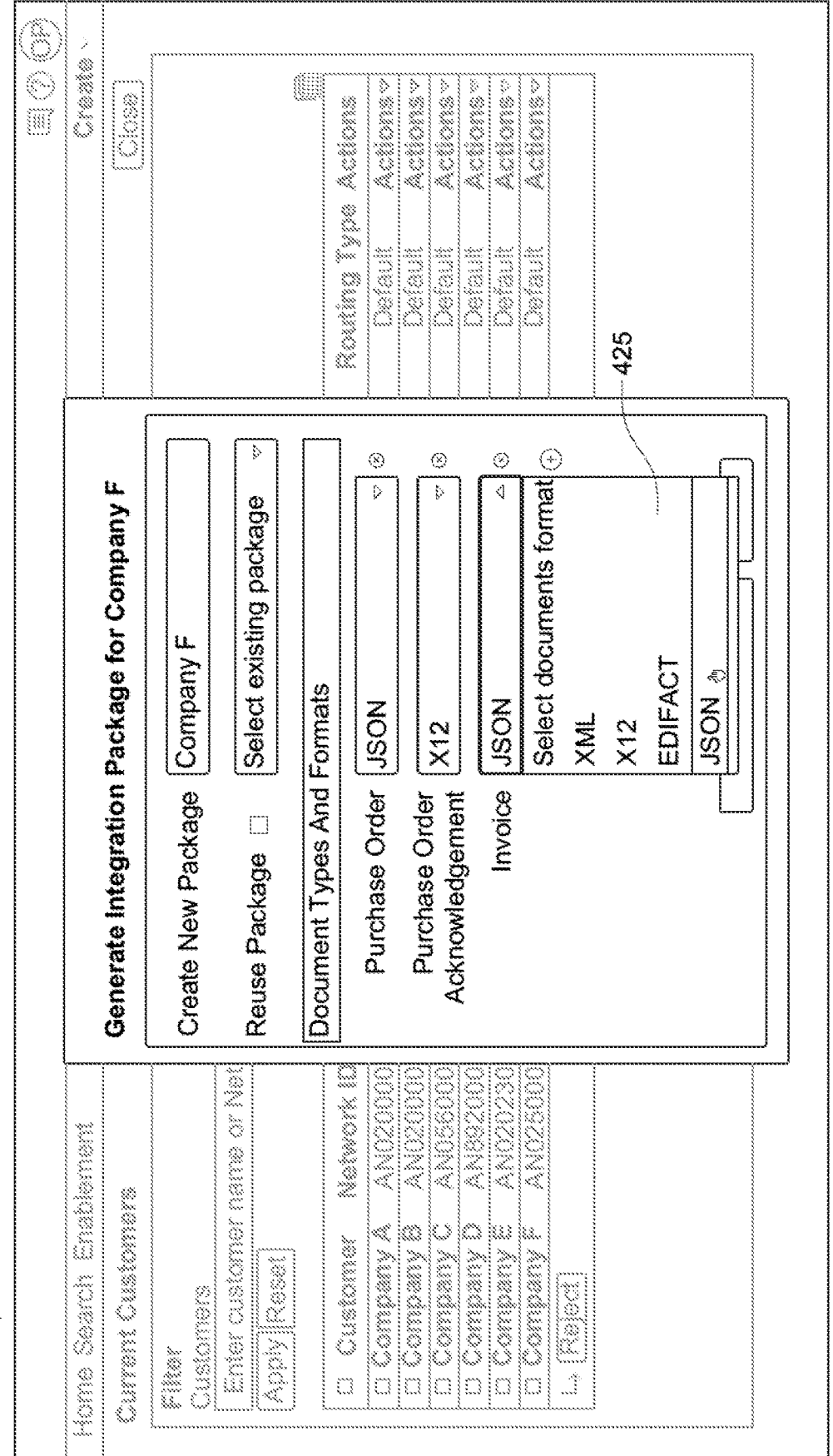

FIG. 4E is an illustration of a screenshot 400E of a user interface which may be presented to a supplier according to an embodiment. If the supplier selected the "Invoice" option shown in screenshot 400D of FIG. 4D, a new dropdown menu 425 may be displayed which gives the supplier an option to select a documentation format for an invoice, such as "XML," "X12," "EDIFACT," or "JSON," to name just a few examples, among many, of supported documentation formats.

Referring back to FIG. 3, at operation 320, a supplier may select a documentation format for a selected documentation type. If, for example, the supplier selects the "JSON" documentation format for the invoice documentation type, the supplier may subsequently either elect to generate an integration package for Company F based on the previously selected options, or the supplier may choose to add an additional documentation type.

Figure 4F:
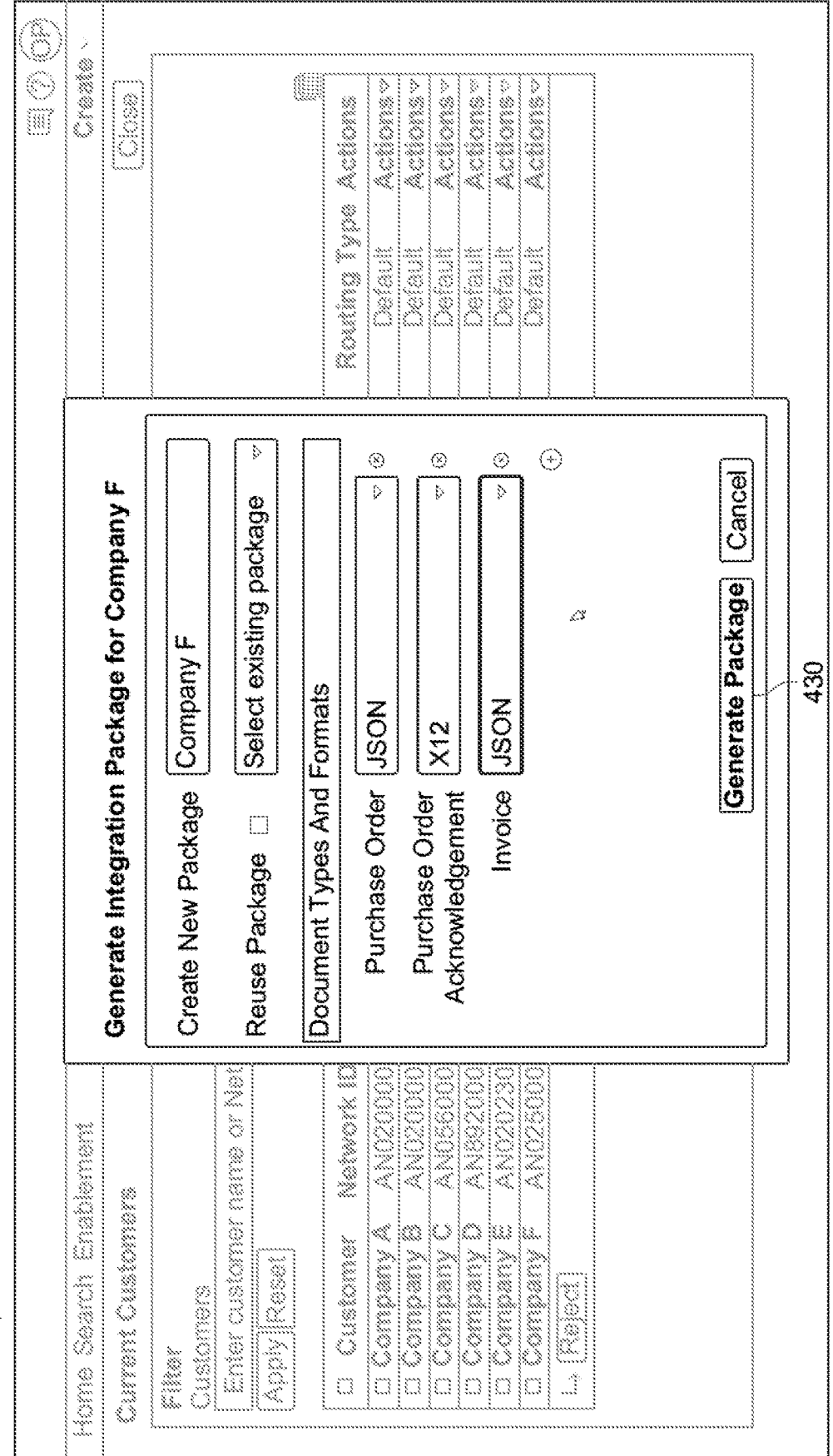

FIG. 4F is an illustration of a screenshot 400F of a user interface which may be presented to a supplier according to an embodiment. As shown in screenshot 4F, the supplier has selected the "JSON" documentation format for the "Invoice" documentation type. Referring back to FIG. 3, the supplier may generate an integration package for Company F at operation 325. For example, the supplier may select a "Generate Package" option 430 or icon as shown in screenshot 400F of FIG. 4F to initiate generation of the integration package for Customer F. After the "Generate Package" option 430 has been selected, the integration package for Customer F made be generated in a middleware application. The integration package may be generated automatically by reading the buyer schema and rules for Company F. Upon creation, the integration package may also be automatically deployed to a middleware application. The automatic generation and deployment of an integration package differs from existing systems, which may require manual coding or selection of options to generate integration information as well as the manual deployment of such integration information to a middleware application, for example.

After the integration package has been generated and deployed to the middleware application, for example, the supplier may launch or otherwise open the middleware application to view generated integration packages. For example, the supplier may view a particular integration package to see details relating to transformations between documentation formats and/or to make additional modifications to such transformations.

FIGS. 5A and 5B are illustrations of a screenshot 500A of generated integration packages for a middleware application according to an embodiment. As shown, there are numerous integration packages which have been generated, one of which is an integration package for Company F, the integration package created via a process in accordance with the process shown in FIG. 3.

Figure 5C:
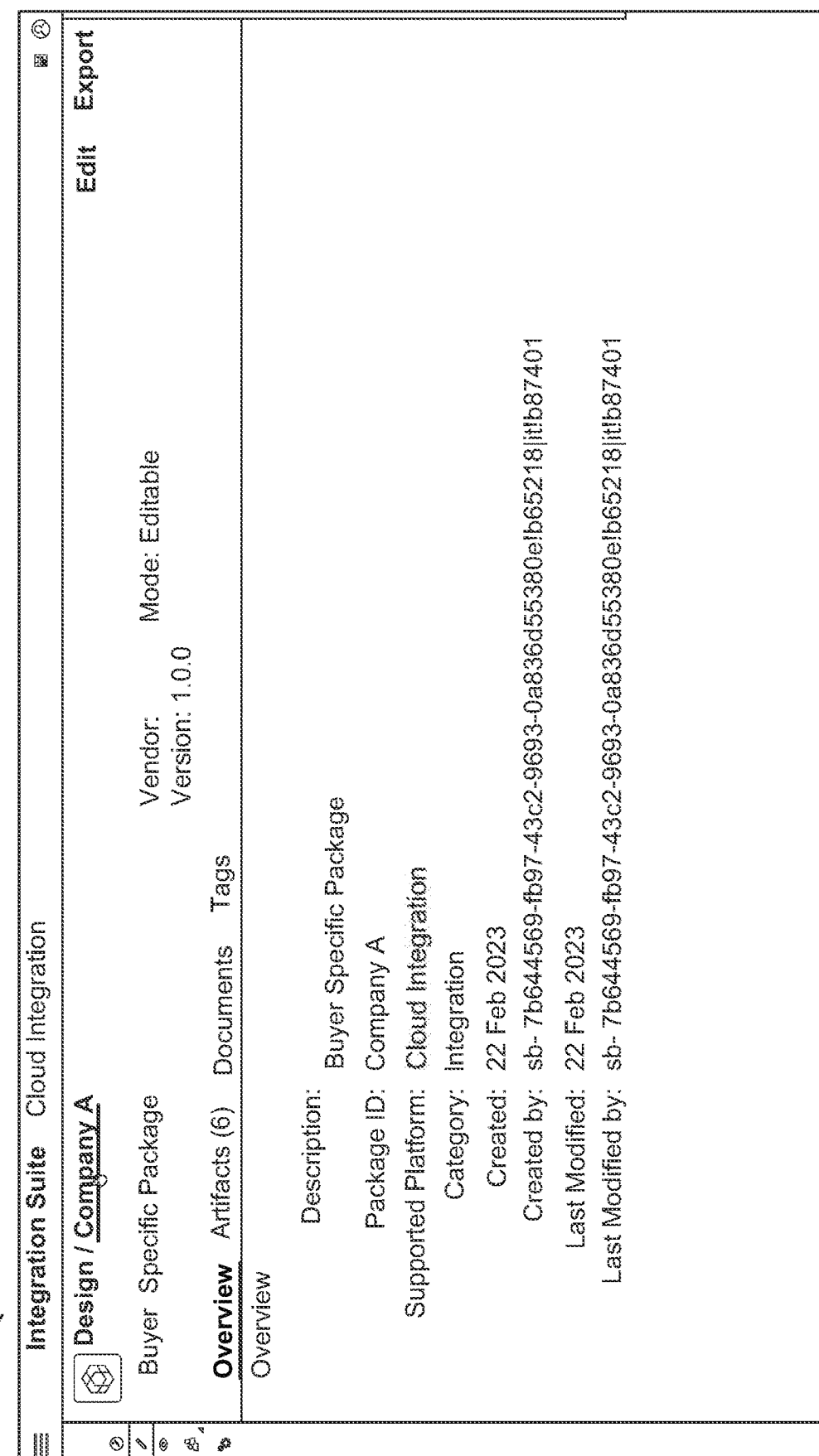

FIG. 5C is an illustration of a screenshot 500B of contents of an integration package which may be displayed on a user interface or portal after a supplier or user has selected to view the integration package for Company F in screenshot 500A of FIGS. 5A and 5B according to an embodiment. Screenshot 500B of FIG. 5C illustrates an overview of the integration suite for Company F. For example, the overview may display information such as a description of the integration package as well as a package ID, a supported platform, a creation date, an indication of the creator of the integration package, the date of last modification, and an indication of the last person entity to modify the integration package. Screenshot 500B may include tabs for additional items such as "Artifacts," "Documents," and "Tags."

FIG. 5D is an illustration of a screenshot 500C of contents of an integration package which may be displayed on a user interface or portal after a user has selected an "Artifacts" tab on an overview page for the integration package for Company F in screenshot 500B of FIG. 5C according to an embodiment. As shown, screenshot 500C illustrates integration flows (iFlows) and message maps for each of three types of documentation, invoices (abbreviated with "Inv"), order confirmations (abbreviated with "OC"), and purchase orders (abbreviated with "PO") for Company F. A user may select any of the displayed artifacts to view additional information about the artifact.

A message map may comprise a representation which may be presented on a user interface. A message map may show a left-hand side schema on a left-hand side of the message map and a right-hand side schema on a right-hand side of the message map, with a transformation occurring between the left-hand side schema and the right-hand side schema. The message map may include drag-and-drop functionality to enable a user to define how transformations occur for data which flows between these fields or formats. A message map may be used for field-to-field conversions between two schemas.

A message map may comprise a portion of an iFlow. An iFlow may define end points to which various entities may connect. For example, the transaction network and a supplier's backend system may connect to an end point defined by iFlow. Data may flow via an iFlow into the message map and may flow out of the message map out after being transformed between schemas.

Figure 5E:
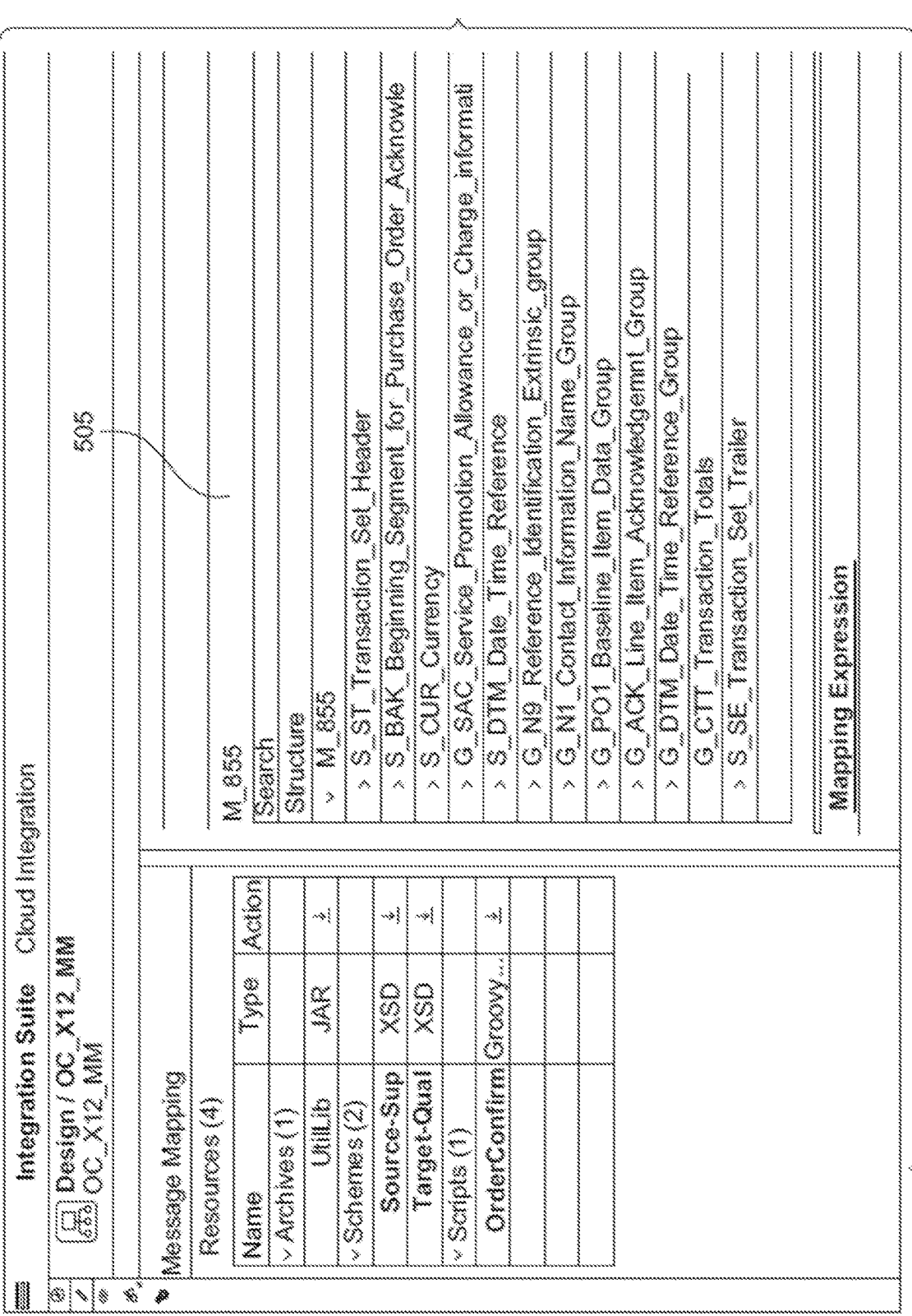
Figure 5F:
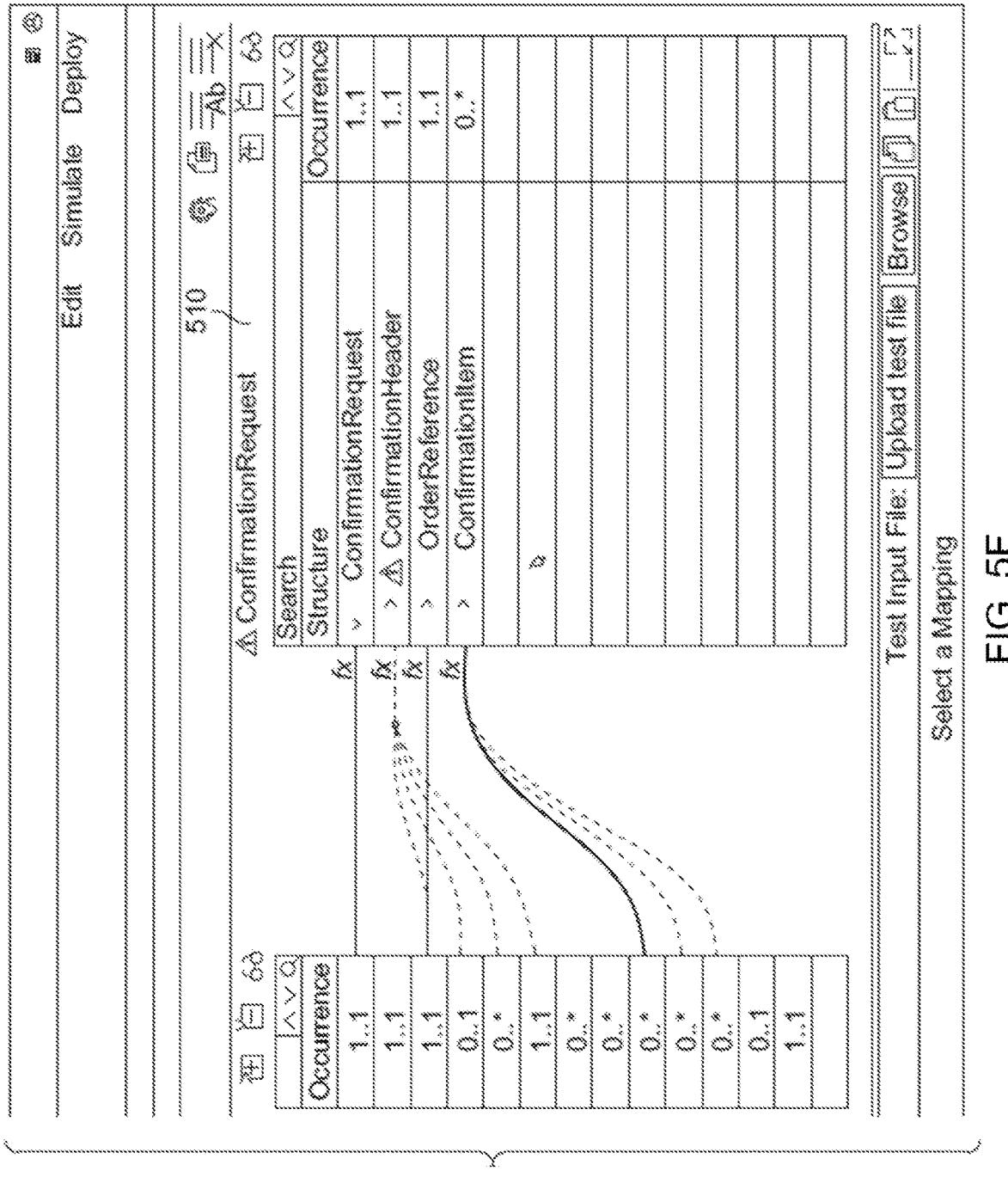

FIGS. 5E and 5F are illustrations of a screenshot 500D of contents of an integration package which may be displayed on a user interface or portal after a user has selected a message mapping artifact for an order confirmation for Company F in screenshot 500C of FIG. 5D according to an embodiment. Screenshot 500D illustrates mappings and transformations between a window 505 showing a supplier's backend format and window 510 showing transaction network XML structures. There are also lines extending between items in window 505 and items in window 510 showing how a field in the supplier's backend format transforms and maps to a field in the transaction network's format or XML structures. The lines extending between fields in windows 505 and 510 may be generated automatically. However, there may be some custom fields for which mappings or transformations are not automatically determined, in which case an administrator of a supplier may use a portal or user interface to access the middleware application to manually set or program the mappings or transformations for such fields.

Figure 5G:
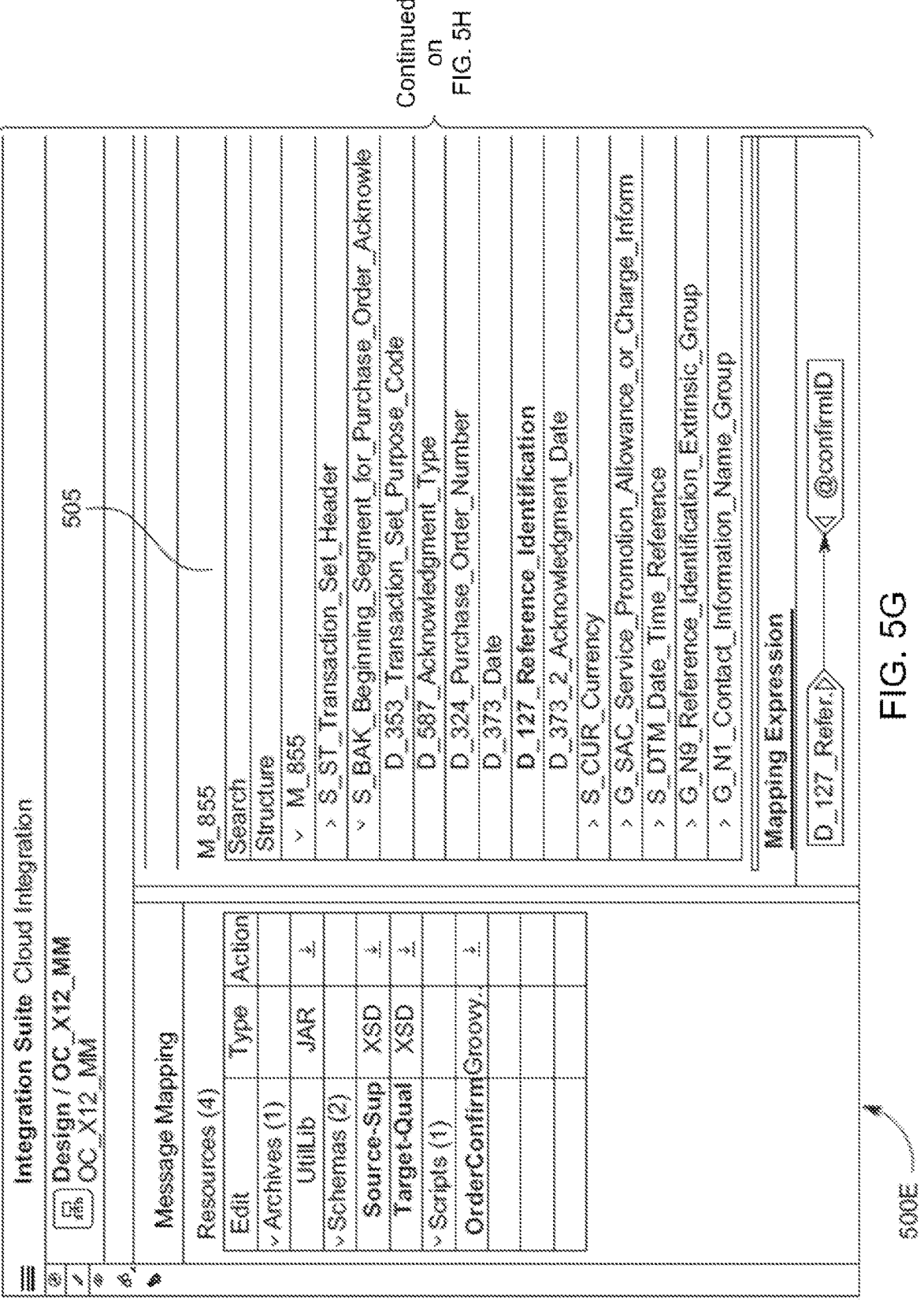
Figure 5H:
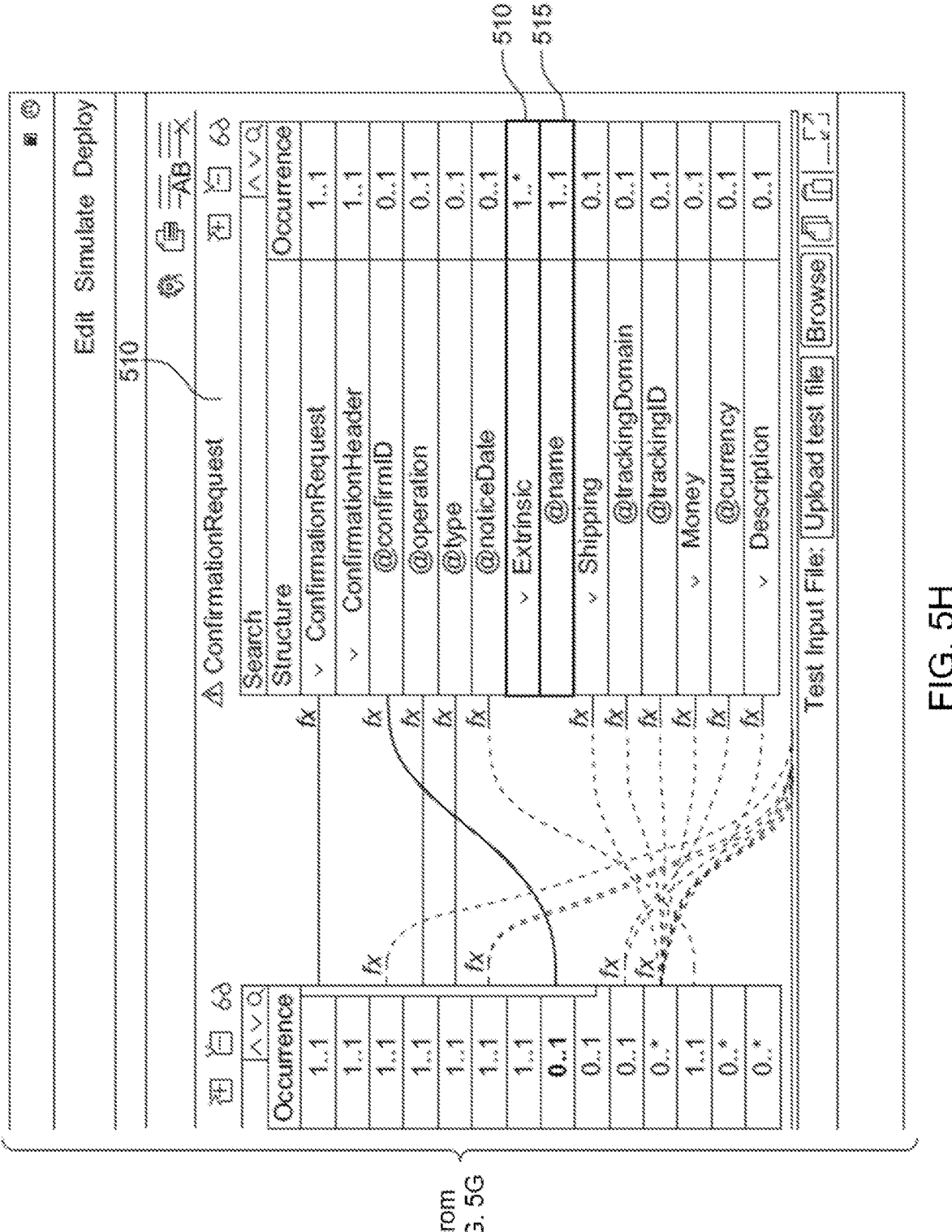

FIGS. 5G and 5H are illustrations of a screenshot 500E of a message mapping which may be displayed on a user interface or portal after a user has selected a message mapping artifact for an order confirmation for Company F after expanding some fields in window 510 in screenshot 500D of FIGS. 5E and 5F according to an embodiment. As shown, there are some fields in window 510 of the transaction network which are not mapped to fields in window 505 of the supplier's backend system. These fields include "Extrinsic" and "@name." These fields may be mapped manually by the supplier, for example.

Figure 6:
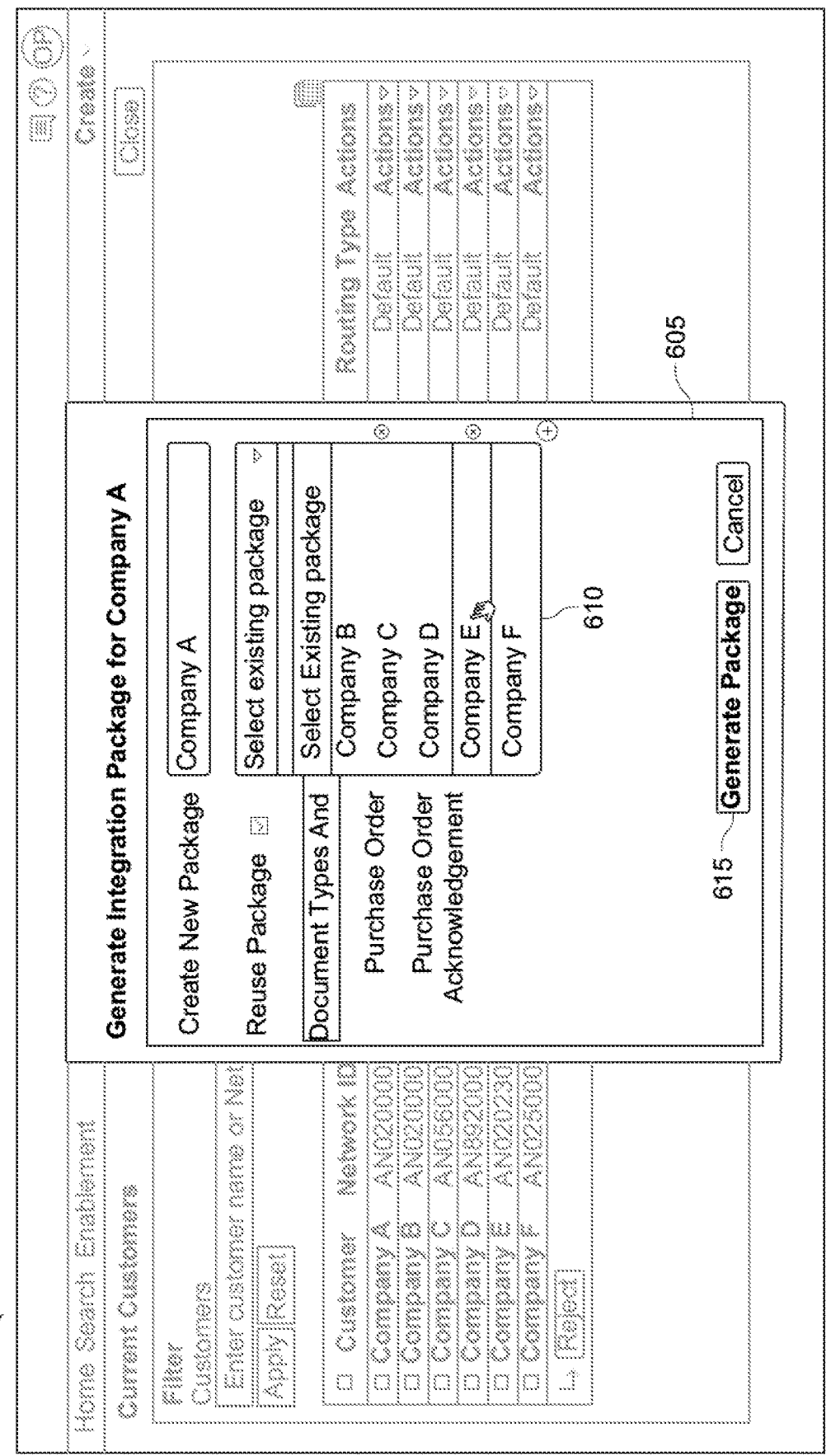
FIG. 6 is an illustration of a screenshot of a user interface which may be presented to a supplier according to an embodiment.

FIG. 6 is an illustration of a screenshot 600 of a user interface which may be presented to a supplier according to an embodiment. As illustrated, screenshot 600 displays an integration wizard 605 which enables a supplier to select a type of integration package to be generated for a particular customer or buyer. In this example, the supplier has selected to generate an integration package for Company A. Screenshot 600 displays an integration wizard 605 which may be similar to an integration wizard 410 shown in screenshot 400C FIG. 4C. However, integration wizard 605 of screenshot 600 differs from integration wizard 410 of screenshot 400C in that a supplier has selected a "reuse package" option. If a supplier selects the "reusage package" option, an integration package may be created for Company A which is identical to and includes the same transformations and mappings as is included in the integration package being copied. In screenshot 600, after selecting the "reuse package" option, a dropdown window 610 may be displayed which lists integration packages available for copying, such as those for Companies B-F. A supplier may select one of the available integration packages to copy for an integration package for Company A. After selecting the integration package to copy, the supplier may select a "Generate package" icon or option 615 to generate a copied integration package for Company A. After a copied integration package for Company A has been generated, the supplier may view the mappings or transformations for the integration package in the middleware application and may add, delete, or adjust the mappings of any fields, as desired, for example.

In some implementations, a relatively large supplier might create multiple accounts for use on the transaction network. Multiple accounts of the supplier might be transacting with the same buyer, or different buyers may be transacting with each of the supplier's accounts. If a supplier has many subsidiary or business units, such as a different one in each country in which the supplier does business, the supplier might choose to have a different supplier account with a different account ID for each of the different supplier accounts. If there are a lot of supplier accounts, such as 50 or 100 different accounts for a single supplier, it may be relatively inefficient for each of the different supplier accounts to have to separately generate integration packages for each of the buyers, particularly when the same buyer is transacting with multiple accounts of the supplier. It may be beneficial for the supplier to be able to see a view of the relationship between buyers and all of the supplier's different accounts in a single place. An embodiment may enable a supplier to integrate or consolidate all of the supplier's different accounts into one master account on the transaction network. For example, such a master account may provide a consolidated view of all of the supplier's different accounts. In one aspect, a supplier may launch a wizard and may select which supplier accounts to be integrated or consolidated within or otherwise linked to a single master supplier account with all of the buyers of all of the supplier's different accounts. In some implementations, a wizard, such as the wizard shown in FIGS. 4C and 6, may generate integration packages for each of the different supplier accounts at a single time and deploy each of them separately for each of the supplier account through the use of such a wizard.

FIG. 7 illustrates an embodiment of architecture of a system 700 at design time. Embodiment 700 may implement functions performed by a wizard described above with respect to FIGS. 4 and 6, for example. As illustrated, system 700 may include several components, such as the transaction network 705, an integration gateway 710, and a middleware application 715. An administrator 720 for a supplier may access the transaction network 705 via a portal or interface, for example. The administrator 720 may, through a portal, select a particular buyer and the types of documentation and formats for documentation for which an integration package is to be determined, such as is described above with respect to FIGS. 3 and 4. Selections made by the administrator 720 may be provided to an Integration Assistant for Supplier 725 on the transaction network 705. Integration Assistant for Supplier 725 may access integration gateway 710 if the buyer is integrated with the integration gateway 710, such as where the buyer uses a backend system which is compatible with the integration gateway 710. If the buyer is integrated with the integration gateway 710, a buyer-specific schema, such as XSD, may be acquired from the integration gateway 710 by Integration Assistant for Supplier 725. On the other hand, if the buyer is not integrated with the integration gateway 710, the Integration Assistant for Supplier 725 may instead infer a schema for the buyer by analyzing previous documentation from the buyer which has flowed into the transaction network 705 for various suppliers. Integration Assistant for Supplier 725 may also identify any particular rules which the buyer requires suppliers to follow for transactions. Integration Assistant for Supplier 725 may combine the determined buyer schema and rules and may generate an integration package for a particular buyer and particular document types. The integration package may be automatically deployed into the middleware application 715 for the supplier. The administrator 720 for the supplier may subsequently access the middleware application 715 to perform any updates or modifications to a memory mapping for translations or mappings, for example.

Figure 8A:
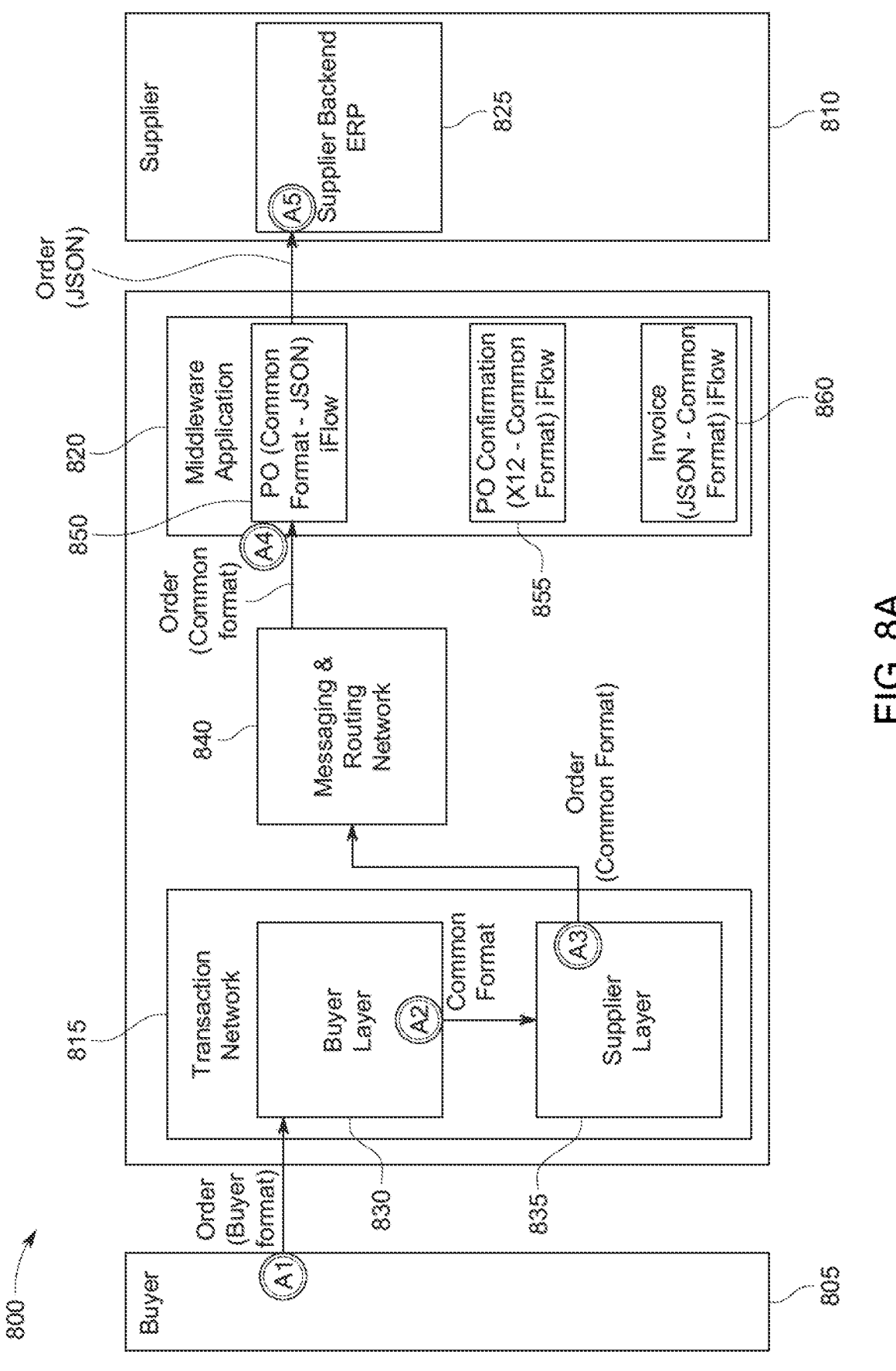
FIGS. 8A-C illustrate flow diagrams for an embodiment of architecture of a system at run time.
Figure 8B:
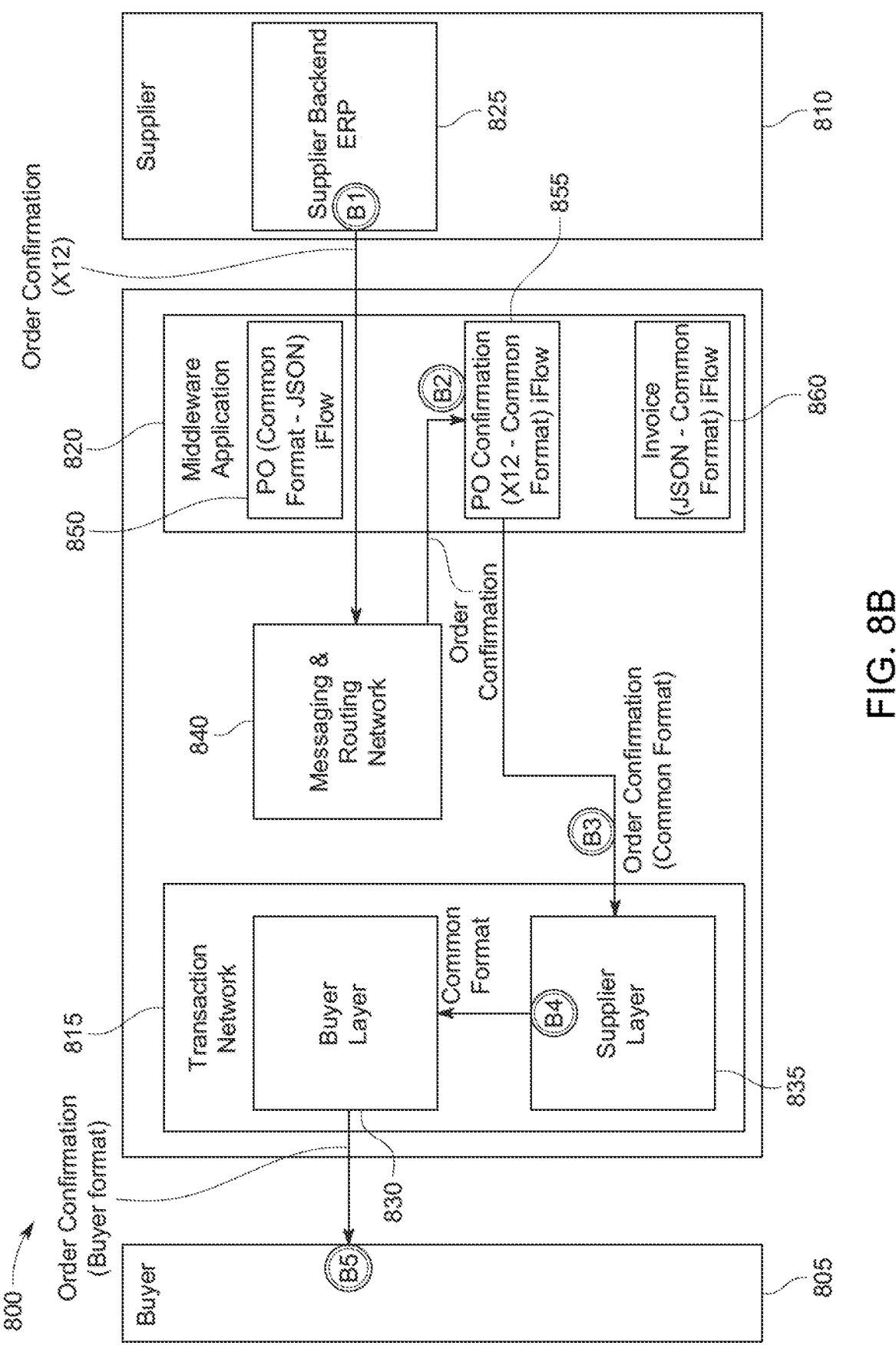
Figure 8C:
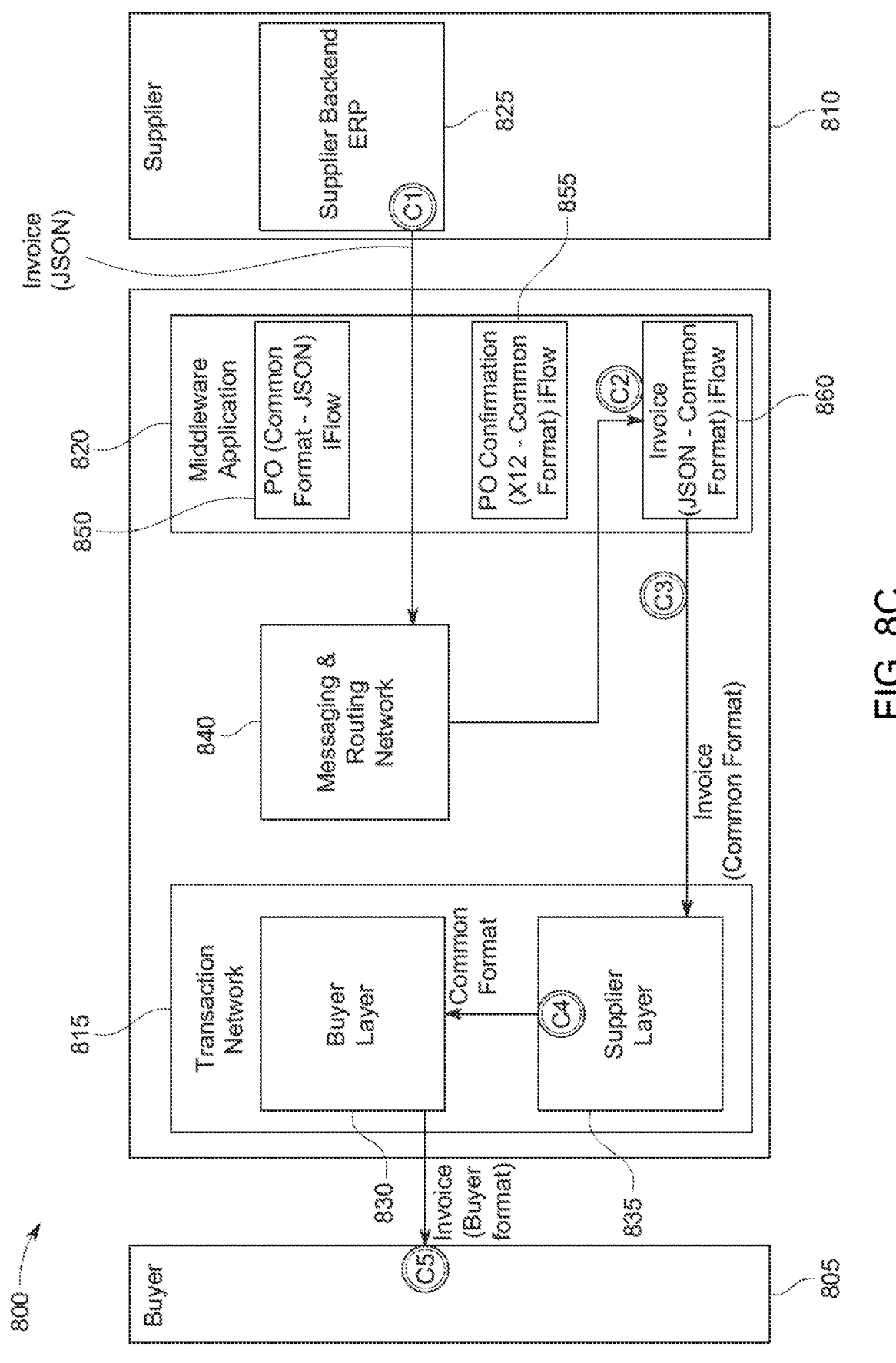

FIGS. 8A-C illustrate flow diagrams for an embodiment of architecture of a system 800 at run time. System 800 includes various entities or devices, including a Buyer 805, a Supplier 810, a Transaction Network 815, a Messaging and Routing Network 840, and a Middleware Application 820 of a Supplier 810. Supplier 810 may include a Supplier Backend ERP 825. Transaction network 815 may include a Buyer Layer 830 and an Supplier Layer 835.

FIG. 8A illustrates the flow of messages through system 800 if Buyer 805 submits a purchase order within a buyer-specific format according to an embodiment. First, the purchase order may be provided from Buyer 805 to Buyer Layer 830 of Transaction Network 815 at operation A1. A message in a common format understood by Transaction Network 815, such as cXML, for example, may be provided from Buyer Layer 830 to Supplier Layer 835 at operation A2. The purchase order, in the common format, may be provided, at operation A3, from the Supplier Layer 835 to a Messaging and Routing Network 840 which may, in turn, provide the purchase order in the common format to Middleware Application 820 at operation A4. For example, the purchase order may be provided to a Purchase Order (Common Format-JSON) iFlow 850, where the purchase order may be converted into a JSON format. The purchase order may subsequently be provided, at operation A5, from Purchase Order (Common Format-JSON) iFlow 850 to Supplier Backend ERP 825 of Supplier 810 for consumption.

FIG. 8B illustrates the flow of messages through system 800 if Supplier 810 confirms a purchase order received from Buyer 805 according to an embodiment. First, Supplier Backend ERP 825 may generate an order confirmation within X12 format and may transmit the order confirmation to Messaging and Routing Network 840 at operation B1. Messaging and Routing Network 840 may, in turn, provide the order confirmation to Purchase Order Confirmation (X12—Common Format) iFlow 855 at operation B2, where the order confirmation may be converted into the common format. The Purchase Order Confirmation (X12—Common Format) iFlow 855 may provide the order confirmation in the common format to Supplier Layer 835 at operation B3. Supplier Layer 835 may provide the Order Confirmation in the common format to Buyer Layer 830 at operation B4. Buyer Layer 830 of Transaction Network 815 may, in turn, convert the order confirmation into a buyer-specific format and may provide the order confirmation, in the buyer-specific format, to Buyer 805 at operation B5.

FIG. 8C illustrates the flow of messages through system 800 if Supplier 810 generates an invoice for Buyer 805 according to an embodiment. First, Supplier Backend ERP 825 may generate an invoice within JSON format. The invoice may be transmitted to Messaging and Routing Network 840 at operation C1. The Messaging and Routing Network 840 may, in turn, provide the invoice to Invoice (JSON—Common Format) iFlow 860 at operation C2, where the invoice may be converted into the common format. Invoice (JSON—Common Format) iFlow 860 may provide the invoice in the common format to Supplier Layer 835 at operation C3. At operation C4, Supplier Layer 835 may provide the invoice in the common format to Buyer Layer 830. Buyer Layer 830 of Transaction Network 815 may, in turn, convert the invoice into a buyer-specific format utilizing the integration middleware and may provide the invoice in the buyer-specific format, to Buyer 805 at operation C5.

Figure 9:
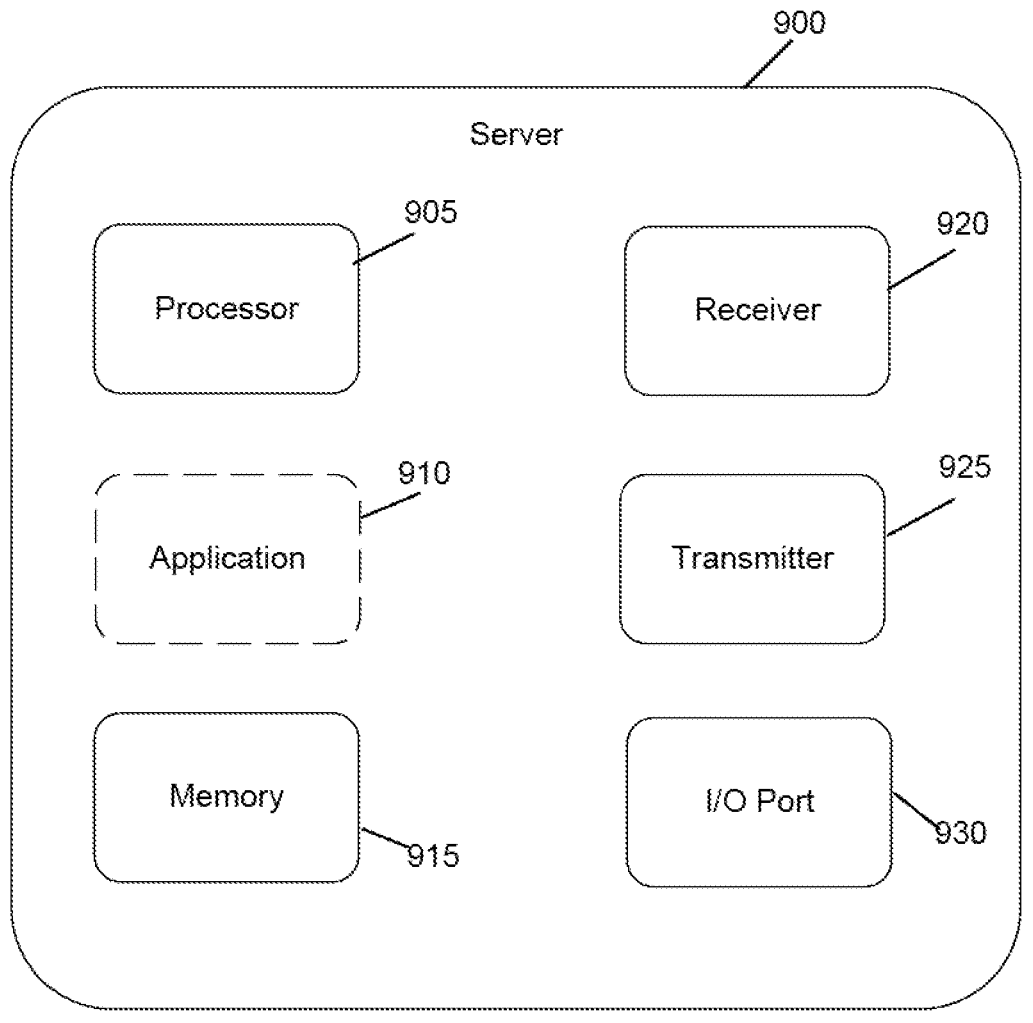
FIG. 9 illustrates a server according to an embodiment.

FIG. 9 illustrates a server 900 according to an embodiment. Server 900 may include a processor 905. Processor 905 may be utilized to execute an application 910. Server may include additional components, such as a memory 915, a receiver 920, a transmitter 925, and an Input/Output (I/O) port 930. Processor 905 may execute computer-executable code stored in memory 915 which may be related to application 910. Application 910 of server 900 may communicate with an application of another server, for example. For example, server 900 may communicate via receiver 920, transmitter 925, and/or I/O port 930.

Processor 905 may launch an interactive wizard to generate a dialog window, such as discussed with respect to FIGS. 4A-6. Such an interactive wizard may receive a request, via the dialog window, from an administrator of a first backend system on a central exchange, for a determination of a schema for documentation produced by a second backend system on the central exchange. Second backend system may engage in one or more transactions with the first backend system, wherein the first backend system is integrated with the central exchange. Interactive wizard may automatically determine the schema for the documentation generated by the second backend system over the central exchange. Interactive wizard may also automatically determine rules for transactions with the second backend system. Interactive wizard may additionally automatically combine the schema and rules for the second backend system. Interactive wizard may further automatically generate an integration package and deploy the integration package within a conversion layer of the first backend system.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method performed by a computing device, the method comprising:

receiving a request, via a user interface, from a first backend system of a supplier of one or more items for sale on a central exchange of a transaction network, for a determination of a schema for documentation produced by a second backend system of a buyer of the one or more items for sale on the central exchange, the second backend system to engage in one or more transactions for the one or more items for sale with the first backend system, wherein the first backend system is integrated with the central exchange;

automatically inspecting the documentation provided by the second backend system for a first predetermined number of transactions between the second backend system and a plurality of suppliers through the transaction network, and additional documentation for a second predetermined number of documents transmitted by one or more of the plurality of suppliers through the transaction network and accepted by the second backend system, to;

automatically identify buyer-specific fields and rules of a buyer-specific format utilized by the second backend system for the predetermined number of transactions;

automatically determine the schema for the documentation generated by the second backend system over the central exchange based, at least in part, on the buyer-specific fields;

automatically determine rules for transactions with the second backend system based, at least in part, on the buyer-specific rules;

automatically combine the schema and rules into a transaction file for the second backend system; and automatically generate an integration package comprising a mapping between the buyer-specific format of the second backend system and a supplier-specific format of the first backend system based on the combined schema and rules of the transaction file and deploying the integration package within a conversion layer of the first backend system, the automatically generating the integration packages comprising copying an existing integration package and replacing one or more fields or rules with the buyer-specific fields or buyer-specific rules, and utilizing one or more Application Programming Interfaces (APIs) to upload artifacts to the integration package.

2. The method of claim 1, wherein the central exchange comprises a transaction network.

3. The method of claim 1, wherein the documentation comprises one or more forms relating to an exchange of goods or services.

4. The method of claim 1, wherein the first backend system comprises a conversion layer to automatically translate documentation in a format specific to the first backend system into a common format used by the central exchange.

5. The method of claim 1, further comprising launching an interactive wizard that enables an administrator of the first backend system to specify one or more types of documentation produced by the second backend system.

6. The method of claim 5, wherein the interactive wizard further enables the administrator to copy a previously generated integration package for transactions between the first backend system and the second backend system to generate a second integration package for transactions between the first backend system and a third backend system.

7. The method of claim 5, wherein the interactive wizard further generates a consolidated view to enable transactions between a plurality of second backend systems interacting with a plurality of different accounts of the first backend system across the central exchange.

8. The method of claim 1, further including presenting a mapping showing a translation or conversion between first fields of documentation produced by the first backend system and second fields of documentation produced by the second backend system.

9. A system comprising:

at least one programmable processor; and a non-transitory machine-readable medium storing instructions that, when executed by the at least one programmable processor, cause the at least one programmable processor to perform operations comprising:

processing a request received from an administrator of a first backend system of a supplier of one or more items for sale on a central exchange of a transaction network, for a determination of a schema for documentation produced by a second backend system of a buyer of the one or more items for sale on the central exchange, the second backend system to engage in one or more transactions with the first backend system, wherein the first backend system is integrated with the central exchange;

automatically inspecting the documentation provided by the second backend system for a first predetermined number of transactions between the second backend system and a plurality of suppliers through the transaction network, and additional documentation for a second predetermined number of documents transmitted by one or more of the plurality of suppliers through the transaction network and accepted by the second backend system, to:

automatically identify buyer-specific fields and rules of a buyer-specific format utilized by the second backend system for the predetermined number of transactions;

automatically determine the schema for the documentation generated by the second backend system over the central exchange based, at least in part, on the buyer-specific fields;

automatically determine rules for transactions with the second backend system based, at least in part, on the buyer-specific rules;

automatically combine the schema and rules into a transaction file for the second backend system; and

automatically generate an integration package comprising a mapping between the buyer-specific format of the second backend system and a supplier-specific format of the first backend system based on the combined schema and rules of the transaction file and deploying the integration package within a conversion layer of the first backend system, the automatic generation of the integration packages comprising copying an existing integration package and replacing one or more fields or rules with the buyer-specific fields or buyer-specific rules, and utilizing one or more Application Programming Interfaces (APIs) to upload artifacts to the integration package.

10. The system of claim 9, wherein the instructions are further executable by the at least one programmable processor to perform at least one additional operation comprising enabling the administrator to copy a previously generated integration package for transactions between the first backend system and the second backend system to generate a second integration package for transactions between the first backend system and a third backend system.

11. The system of claim 9, wherein the instructions are further executable by the at least one programmable processor to perform at least one additional operation comprising generating a consolidated view to enable transactions between a plurality of second backend systems interacting with a plurality of different accounts of the first backend system across the central exchange.

12. The system of claim 9, wherein the instructions are further executable by the at least one programmable processor to perform at least one additional comprising presenting a user interface to displace a mapping showing a translation or conversion between first fields of documentation produced by the first backend system and second fields of documentation produced by the second backend system.

13. The system of claim 9, wherein the instructions are further executable by the at least one programmable processor to perform at least one additional comprising generating a dialog window to enable an administrator to provide a user input comprising the request for the determination of the schema.

14. The system of claim 9, wherein the central exchange comprises a transaction network.

15. An article, comprising:

a non-transitory storage medium comprising machine-readable instructions executable by a processor to:

process a request, received via a user interface, from a first backend system of a supplier of one or more items for sale on a central exchange of a transaction network, for a determination of a schema for documentation produced by a second backend system of a buyer of the one or more items for sale on the central exchange, the second backend system to engage in one or more transactions for the one or more items for sale with the first backend system, wherein the first backend system is integrated with the central exchange;

automatically inspect the documentation provided by the second backend system for a first predetermined number of transactions between the second backend system and a plurality of suppliers through the transaction network, and additional documentation for a second predetermined number of documents transmitted by one or more of the plurality of suppliers through the transaction network and accepted by the second backend system, to;

automatically identify buyer-specific fields and rules of a buyer-specific format utilized by the second backend system for the predetermined number of transactions;

automatically determine the schema for the documentation generated by the second backend system over the central exchange based, at least in part, on the buyer-specific fields;

automatically determine rules for transactions with the second backend system based, at least in part, on the buyer-specific rules;

automatically combine the schema and rules into a transaction file for the second backend system; and automatically generate an integration package comprising a mapping between the buyer-specific format of the second backend system and a supplier-specific format of the first backend system based on the combined schema and rules of the transaction file and deploy the integration package within a conversion layer of the first backend system, the automatic generation of the integration packages comprising copying an existing integration package and replacing one or more fields or rules with the buyer-specific fields or buyer-specific rules, and utilizing one or more Application Programming Interfaces (APIs) to upload artifacts to the integration package.

16. The article of claim 15, wherein the machine-readable instructions are further executable by the processor to launch an interactive wizard to enable an administrator of the first backend system to specify one or more types of documentation produced by the second backend system.

17. The article of claim 15, wherein the machine-readable instructions are further executable by the processor to copy a previously generated integration package for transactions between the first backend system and the second backend system to generate a second integration package for transactions between the first backend system and a third backend system.

18. The article of claim 15, wherein the machine-readable instructions are further executable by the processor to generate a consolidated view to enable transactions between a plurality of second backend systems interacting with a plurality of different accounts of the first backend system across the central exchange.

19. The article of claim 15, wherein the machine-readable instructions are further executable by the processor to present a mapping showing a translation or conversion between first fields of documentation produced by the first backend system and second fields of documentation produced by the second backend system.

20. The article of claim 15, wherein the first backend system comprises a conversion layer to automatically translate documentation in a format specific to the first backend system into a common format used by the central exchange.

* * * * *